United States Patent
Tsai et al.

(10) Patent No.: US 8,649,114 B2
(45) Date of Patent: Feb. 11, 2014

(54) IMAGING OPTICAL LENS SYSTEM

(75) Inventors: Tsung-Han Tsai, Taichung (TW); Wei-Yu Chen, Taichung (TW)

(73) Assignee: Largan Precision Co., Ltd, Taichung (TW)

( * ) Notice: Subject to any disclaimer, the term of this patent is extended or adjusted under 35 U.S.C. 154(b) by 9 days.

(21) Appl. No.: 13/586,334

(22) Filed: Aug. 15, 2012

(65) Prior Publication Data

US 2013/0301144 A1    Nov. 14, 2013

(30) Foreign Application Priority Data

May 8, 2012 (TW) .............................. 101116331 A

(51) Int. Cl.
*G02B 9/12* (2006.01)
*G02B 3/02* (2006.01)
*G02B 13/18* (2006.01)

(52) U.S. Cl.
USPC .......................................... 359/716; 359/784

(58) Field of Classification Search
CPC .............. G02B 3/02; G02B 9/02; G02B 9/12; G02B 9/34; G02B 9/36; G02B 9/60; G02B 9/62; G02B 9/64; G02B 13/18
USPC ......... 359/708–716, 754–757, 763–765, 771, 359/772, 775, 784
See application file for complete search history.

(56) References Cited

U.S. PATENT DOCUMENTS

| | | | |
|---|---|---|---|
| 7,046,460 B2 * | 5/2006 | Nozawa | 359/791 |
| 7,957,076 B2 | 6/2011 | Tang | |
| 8,089,704 B2 | 1/2012 | Tang et al. | |
| 8,094,231 B2 | 1/2012 | Tsai | |
| 2005/0231826 A1 * | 10/2005 | Murakami et al. | 359/754 |

* cited by examiner

*Primary Examiner* — Darryl J Collins
(74) *Attorney, Agent, or Firm* — Morris Manning & Martin LLP; Tim Tingkang Xia, Esq.

(57) ABSTRACT

This invention provides an imaging optical lens system comprising three lens elements with refractive power: a positive first lens element having a convex object-side surface at a paraxial region; a negative plastic second lens element having a convex or flat object-side surface and a concave image-side surface at a paraxial region, and both the object-side surface and the image-side surface being aspheric; and a negative plastic third lens element having a concave object-side surface at a paraxial region, the shape of the image-side surface thereof changing from concave when near an optical axis to convex when away from the optical axis, and both the object-side surface and the image-side surface being aspheric. The aforesaid arrangement can not only effectively correct the astigmatism of the system against defocus problems but also effectively reduce the back focal length for desirable space usage. Therefore, the lens system can be more compact.

21 Claims, 25 Drawing Sheets

IMAGING OPTICAL LENS SYSTEM

CROSS-REFERENCE TO RELATED APPLICATION

This non-provisional application claims priority under 35 U.S.C. §119(a) on Patent Application No. 101116331 filed in Taiwan (R.O.C.) on May 8, 2012, the entire contents of which are hereby incorporated by reference.

BACKGROUND OF THE INVENTION

1. Field of the Invention

The present invention relates to an imaging optical lens system, and more particularly, to an imaging optical lens system used in compact electronic products and 3D applications thereof.

2. Description of the Prior Art

The principal demand of modern electronic products is compact and portable; therefore, apart from reducing manufacture costs, the requirement of being compact and portable is essential for the optical systems on today's various portable electronics such as smart phones, tablets, Ultrabooks, etc. As an optical system disclosed in U.S. Pat. No. 7,957,076, conventional optical systems tend to have only two lens elements for reducing manufacture costs; however, the aberration correction ability thereof is limited as the two-lens-element optical system fails to satisfy higher demand in image quality.

On the other hand, the four-lens-element lens system, such as the one disclosed in U.S. Pat. No. 8,089,704 B2, is not compact enough as too many lens elements are allocated, and the costs and the manufacture complexity are relatively higher. In addition, the three-lens-element system disclosed in U.S. Pat. No. 8,094,231 B2 has limited imaging performance and quality due to deficiency of defocus resulting from serious off-axis aberration. Moreover, the configuration of the optical system fails to reduce the back focal length thereof and results the optical system being larger than desired.

In light of the foregoing, conventional optical systems have drawbacks of undesirable imaging quality and excessively long total track length that are not suitable for compact portable electronics. It is therefore well-known that the issue of obtaining a favorable balance between image quality and total track length has existed in the field. Therefore, there is a need for an imaging system having superior image quality and compact design for space usage in the system, which is suitable for portable electronics.

SUMMARY OF THE INVENTION

The present invention provides an imaging optical lens system, in order from an object side to an image side comprising three lens elements with refractive power: a first lens element with positive refractive power having a convex object-side surface at a paraxial region; a plastic second lens element with negative refractive power having a convex or flat object-side surface at a paraxial region and a concave image-side surface at a paraxial region, and both the object-side surface and the image-side surface being aspheric; and a plastic third lens element with negative refractive power having a concave object-side surface at a paraxial region, the shape of the image-side surface thereof changing from concave when near an optical axis to convex when away from the optical axis, and both the object-side surface and the image-side surface being aspheric; wherein the lens elements having refractive power in the imaging optical lens system are the first lens element, the second lens element and the third lens element; wherein a curvature radius of the object-side surface of the second lens element is R3, a curvature radius of the image-side surface of the second lens element is R4, a focal length of the third lens element is f3, a focal length of the second lens element is f2, and they satisfy the following relations: $0<(R3-R4)/(R3+R4)\le 1.0$; and $0<f3/f2<3.0$.

On the other hand, the present invention provides an imaging optical lens system, in order from an object side to an image side comprising three lens elements with refractive power: a first lens element with positive refractive power having a convex object-side surface at a paraxial region; a plastic second lens element with negative refractive power having a convex or flat object-side surface at a paraxial region and a concave image-side surface at a paraxial region, and both the object-side surface and the image-side surface being aspheric; and a plastic third lens element with negative refractive power having a concave object-side surface at a paraxial region, the shape of the image-side surface thereof changing from concave when near an optical axis to convex when away from the optical axis, and both the object-side surface and the image-side surface being aspheric; wherein the lens elements having refractive power in the imaging optical lens system are the first lens element, the second lens element and the third lens element; wherein a curvature radius of the object-side surface of the second lens element is R3, a curvature radius of the image-side surface of the second lens element is R4, an Abbe number of the first lens element is V1, an Abbe number of the second lens element is V2, and they satisfy the following relations: $0<(R3-R4)/(R3+R4)\le 1.0$; and $1.8<(V1+V2)/(V1-V2)<5.0$.

The aforesaid arrangement can not only effectively correct the astigmatism of the system against defocus problems but also effectively reduce the back focal length for desirable space usage. Therefore, the lens system can be more compact.

In the aforementioned imaging optical lens system, the first lens element has positive refractive power, which provides the main refractive power for the imaging optical lens system and is favorable for reducing the total track length of the system. When the second has negative refractive power, the aberration produced by the positive first lens element with can be favorably corrected. When the third lens element has negative refractive power, the principal point of the optical system can be positioned away from the image plane, which is favorable for shortening the total optical track of the system and keeping the system compact.

In the aforementioned imaging optical lens system, the first lens element may be a bi-convex lens element or a meniscus lens element having a convex object-side surface at a paraxial region and a concave image-side surface at the paraxial region thereof. When the first lens element is a bi-convex lens element, the refractive power of thereof can be effectively strengthened for reducing the total track length of the imaging optical lens system. When the first lens element is a convex-concave meniscus lens element, it is favorable for astigmatism correction of the imaging optical lens system. When the second lens element has a convex or flat object-side surface at the paraxial region and a concave image-side surface at the paraxial region, the aberration produced by the first lens element can be favorably corrected. Moreover, when at least one inflection point is positioned on the second lens element, the incident angle on the image sensor from the off-axis field can be suppressed and the off-axis aberration can be corrected. When the third lens element has a concave object-side surface at the paraxial region and a concave image-side surface at the paraxial region, the back focal length can be compressed and the space can be adequately used for keeping the imaging optical lens system more compact. Furthermore, when the shape of the image-side surface of the third lens element changes from concave when near an optical axis to convex when away from the optical axis, the incident angle on the image sensor from the off-axis field can be suppressed, and thereby the sensing sensitivity of the image sensor can be improved as well as the off-axis aberration can be corrected.

DETAILED DESCRIPTION OF THE PREFERRED EMBODIMENTS

Figure 1A:
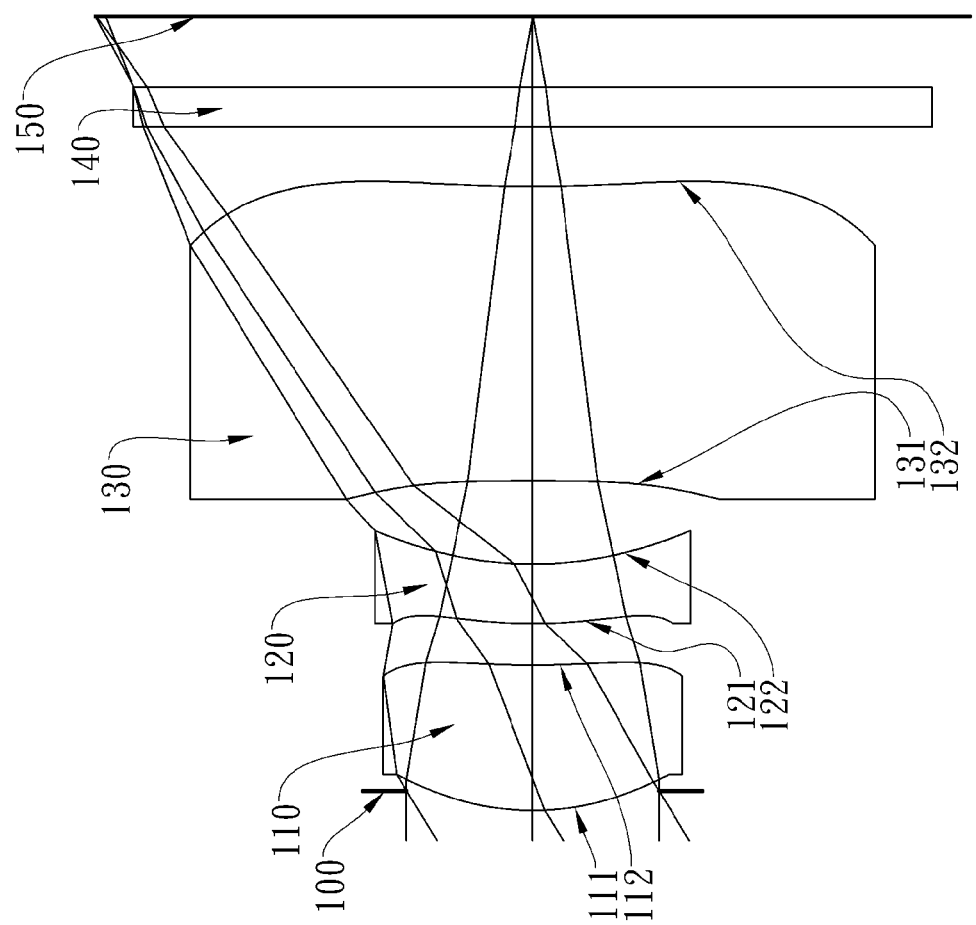
FIG. 1A shows an imaging optical lens system in accordance with a first embodiment of the present invention.

The present invention provides an imaging optical lens system, in order from an object side to an image side comprising three lens elements with refractive power: a first lens element with positive refractive power having a convex object-side surface at a paraxial region; a plastic second lens element with negative refractive power having a convex or flat object-side surface at a paraxial region and a concave image-side surface at a paraxial region, and both the object-side surface and the image-side surface being aspheric; and a plastic third lens element with negative refractive power having a concave object-side surface at a paraxial region, the shape of the image-side surface thereof changing from concave when near an optical axis to convex when away from the optical axis, and both the object-side surface and the image-side surface being aspheric; wherein the lens elements having refractive power in the imaging optical lens system are the first lens element, the second lens element and the third lens element; wherein a curvature radius of the object-side surface of the second lens element is R3, a curvature radius of the image-side surface of the second lens element is R4, a focal length of the third lens element is f3, a focal length of the second lens element is f2, and they satisfy the following relations: $0<(R3-R4)/(R3+R4)\leq 1.0$; and $0<f3/f2<3.0$.

When the relation of $0<(R3-R4)/(R3+R4)\leq 1.0$ is satisfied, the well-adjusted curvature radius of the second lens element is favorable for aberration and astigmatism correction of the imaging optical lens system.

When the relation of $0<f3/f2<3.0$ is satisfied, the refractive power of the second lens element and the third lens element is more suitable for aberration correction and reducing sensitivity; preferably, the following relation is satisfied: $0.1<f3/f2<2.0$.

In the aforementioned imaging optical lens system, the curvature radius of the image-side surface of the second lens element is R4, a focal length of the imaging optical lens system is f, and they preferably satisfy the following relation: $0.2<R4/f<2.0$. When the above relation is satisfied, the Petzval Sum and aberration of the imaging optical lens system can be favorably lowered for improving the resolution of the imaging optical lens system.

In the aforementioned imaging optical lens system, a curvature radius of the image-side surface of the third lens element is R6, a curvature radius of the object-side surface of the third lens element is R5, and they preferably satisfy the following relation: $-0.40<R6/R5<0$. When the above relation is satisfied, the back focal length can be effectively compressed and the space can be used adequately for keeping the imaging optical lens system more compact.

In the aforementioned imaging optical lens system, an Abbe number of the first lens element is V1, an Abbe number of the second lens element is V2, and they preferably satisfy the following relation: $2.0<(V1+V2)/(V1-V2)<3.0$. When the above relation is satisfied, the excessive disparity between the focusing performance of short wavelength and long wavelength can be avoided. Also, the advantage of correcting chromatic aberration can be obtained.

In the aforementioned imaging optical lens system, a central thickness of the first lens element is CT1, a central thickness of the second lens element is CT2, a central thickness of the third lens element is CT3, and they preferably satisfy the following relation: $0.5<(CT1+CT2)/CT3<1.0$. When the above relation is satisfied, the thickness of each lens element is more suitable for manufacture and formation of lens elements, and thereby the yield rate can be improved. It is also favorable for keeping the system compact.

In the aforementioned imaging optical lens system, a distance in parallel with an optical axis from an axial vertex on the object-side surface of the second lens element to a maximal effective diameter position on the object-side surface of the second lens element is SAG21, with the direction toward the image-side side defined as positive or vice versa, the central thickness of the second lens element is CT2, and they preferably satisfy the following relation: $-0.5<\text{SAG}21/\text{CT}2<0.2$. When the above relation is satisfied, the shape of the second lens element is not excessively curved and the thickness thereof is suitable, which is not only favorable for the manufacture of the lens elements, but also favorable for reducing the space required for assembling lens elements and thereby the arrangement of the system could be more compact.

In the aforementioned imaging optical lens system, a curvature radius of the object-side surface of the first lens element is R1, a curvature radius of the image-side surface of the first lens element is R2, and they preferably satisfy the following relation: $0<|\text{R}1/\text{R}2|<0.4$. When the above relation is satisfied, it is favorable for spherical aberration corrections and a proper arrangement of the positive refractive power of the first lens element.

In the aforementioned imaging optical lens system, an axial distance between the image-side surface of the third lens element and an image plane is BL, a focal length of the imaging optical lens system is f, and they preferably satisfy the following relation: $0.10<\text{BL}/\text{f}<0.35$. When the above relation is satisfied, a sufficient back focal length can be ensured for the system for placing other required optical elements without making the total track length excessively long to keep the imaging optical lens system more compact.

In the aforementioned imaging optical lens system, the focal length of the imaging optical lens system is f, a focal length of the first lens element is f1, and they preferably satisfy the following relation: $1.0<\text{f}/\text{f}1<2.0$. When the above relation is satisfied, the refractive power of the first lens element is more balanced for effectively controlling the total track length of the system and preventing the spherical aberration and astigmatism from being excessively large.

On the other hand, the present invention provides an imaging optical lens system, in order from an object side to an image side comprising three lens elements with refractive power: a first lens element with positive refractive power having a convex object-side surface at a paraxial region; a plastic second lens element with negative refractive power having a convex or flat object-side surface at a paraxial region and a concave image-side surface at a paraxial region, and both the object-side surface and the image-side surface being aspheric; and a plastic third lens element with negative refractive power having a concave object-side surface at a paraxial region, the shape of the image-side surface thereof changing from concave when near an optical axis to convex when away from the optical axis, and both the object-side surface and the image-side surface being aspheric; wherein the lens elements having refractive power in the imaging optical lens system are the first lens element, the second lens element and the third lens element; wherein a curvature radius of the object-side surface of the second lens element is R3, a curvature radius of the image-side surface of the second lens element is R4, an Abbe number of the first lens element is V1, an Abbe number of the second lens element is V2, and they satisfy the following relations: $0<(\text{R}3-\text{R}4)/(\text{R}3+\text{R}4)\leq 1.0$; and $1.8<(\text{V}1+\text{V}2)/(\text{V}1-\text{V}2)<5.0$.

When the relation of $0<(\text{R}3-\text{R}4)/(\text{R}3+\text{R}4)\leq 1.0$ is satisfied, the well-adjusted curvature radius of the second lens element is favorable for aberration and astigmatism correction of the imaging optical lens system.

When the relation of $1.8<(\text{V}1+\text{V}2)/(\text{V}1-\text{V}2)<5.0$ is satisfied, the excessive disparity between the focusing performance of short wavelength and long wavelength can be avoided. Also, the advantage of correcting chromatic aberration can be obtained; preferably the following relation is satisfied: $2.0<(\text{V}1+\text{V}2)/(\text{V}1-\text{V}2)<3.0$.

In the aforementioned imaging optical lens system, an axial distance between the image-side surface of the third lens element and an image plane is BL, a focal length of the imaging optical lens system is f, and they preferably satisfy the following relation: $0.10<\text{BL}/\text{f}<0.35$. When the above relation is satisfied, a sufficient back focal length can be ensured for the system for placing other required optical elements without making the total track length excessively long to keep the imaging optical lens system more compact.

In the aforementioned imaging optical lens system, the Abbe number of the first lens element is V1, an Abbe number of the third lens element is V3, and they preferably satisfy the following relation: $1.5<\text{V}1/\text{V}3<3.5$. When the above relation is satisfied, chromatic aberration of the system can be favorably corrected.

In the aforementioned imaging optical lens system, half of the maximal field of view of the imaging optical lens system is HFOV, and it preferably satisfies the following relation: $25\text{ degree}<\text{HFOV}<40\text{ degree}$. When the above relation is satisfied, a proper field of view can be obtained. An excessive large field of view results in severe distortion of off-axis image; whereas, an excessive small field of view limits the scope of imaging; therefore, by properly adjusting the field of view, a proper imaging scope can be obtained without causing distortion.

In the aforementioned imaging optical lens system, a distance in parallel with an optical axis from an vertex on the object-side surface of the second lens element to a maximal effective diameter position on the object-side surface of the second lens element is SAG21, with the direction toward the image-side side defined as positive or vice versa, the central thickness of the second lens element is CT2, and they preferably satisfy the following relation: $-0.5<\text{SAG}21/\text{CT}2<0.2$. When the above relation is satisfied, the shape of the second lens element is not excessively curved and the thickness thereof is suitable, which is not only favorable for the manufacture of lens elements, but also favorable for reducing the space required for assembling lens elements and thereby the arrangement of the system could be more compact.

In the aforementioned imaging optical lens system, a curvature radius of the object-side surface of the first lens element is R1, a curvature radius of the image-side surface of the first lens element is R2, and they preferably satisfy the following relation: $0<|\text{R}1/\text{R}2|<0.4$. When the above relation is satisfied, it is favorable for spherical aberration corrections and a proper arrangement of the positive refractive power of the first lens element.

In the aforementioned imaging optical lens system, a central thickness of the first lens element is CT1, a central thickness of the second lens element is CT2, a central thickness of the third lens element is CT3, and they preferably satisfy the following relation: $0.5<(\text{CT}1+\text{CT}2)/\text{CT}3<1.0$. When the above relation is satisfied, the thickness of each lens element is more suitable for manufacture and formation of lens elements, and thereby the yield rate can be improved. It is also favorable for keeping the system compact.

In the aforementioned imaging optical lens system, a curvature radius of the image-side surface of the third lens element is R6, a curvature radius of the object-side surface of the third lens element is R5, and they preferably satisfy the following relation: $-0.40<\text{R}6/\text{R}5<0$. When the above relation is satisfied, the high order aberration of the system can be favorably corrected for improving the imaging quality. Besides, the back focal length can be effectively compressed and the space can be adequately used for keeping the imaging optical lens system more compact.

In the aforementioned imaging optical lens system, the lens elements can be made of glass or plastic material. If the lens elements are made of glass, the freedom for distributing the refractive power of the imaging optical lens system can be increased. If plastic material is adopted to produce the lens elements, the production costs will be reduced effectively. Additionally, the surfaces of the lens elements can be aspheric and easily made into non-spherical profiles, allowing more design parameter freedom which can be used to reduce aberrations and the required number of the lens elements used in an optical system. Consequently, the total track length of the imaging optical lens system can be effectively reduced.

The present imaging optical lens system may comprise at least one stop. Said stop includes but not limits to an aperture stop, a glare stop, or a field stop. Said glare stop or said field stop can be configured for reducing stray light resulting in improved image quality.

In the present imaging optical lens system, an aperture stop can be configured as a front stop or a middle stop. A front stop can provide a longer distance between an exit pupil of the system and an image plane which can improve the image-sensing efficiency of an image sensor, such as CCD or CMOS. On the other hand, a middle stop is favorable for enlarging the field of view of the system as well as providing features associated with a wider field of view.

In the present imaging optical lens system, if a lens element has a convex surface, it means the portion of the surface in proximity to the optical axis is convex; if a lens element has a concave surface, it means the portion of the surface in proximity to the optical axis is concave.

Figure 13:
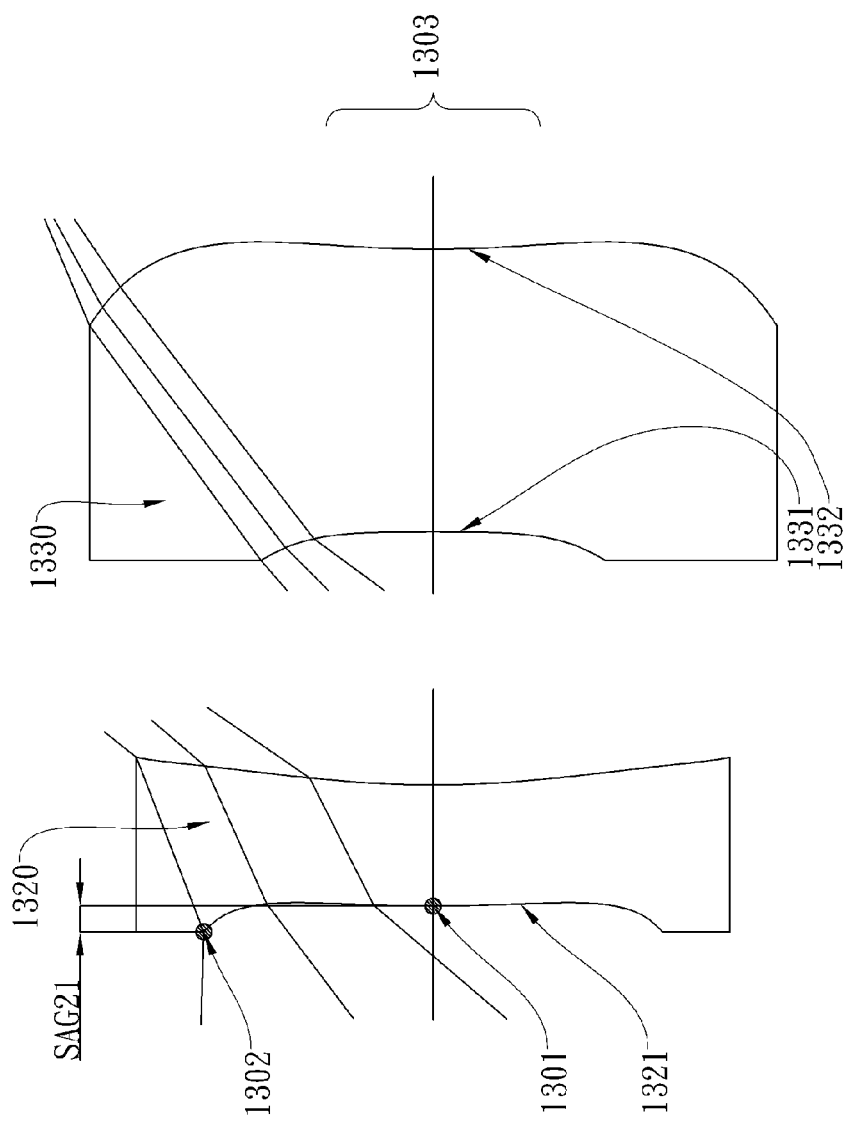
FIG. 13 shows the distance and relative site represented by SAG21 and illustrates the changes in shape of the image-side surface of the third lens element.

Please refer to FIG. 13, a distance in parallel with an optical axis from an axial vertex 1301 on the object-side surface 1321 of the second lens element 1320 to a maximal effective diameter position 1302 on the object-side surface 1321 of the second lens element 1320 is SAG21, with the direction toward the image-side side defined as positive or vice versa. Besides, the third lens element 1330 has a concave object-side surface 1331 and a concave image-side surface 1332; more specifically, the shape of the image-side surface 1332 thereof changes from concave when near an optical axis 1303 to convex when away from the optical axis.

Preferred embodiments of the present invention will be described in the following paragraphs by referring to the accompanying drawings.

Embodiment 1

Figure 1B:
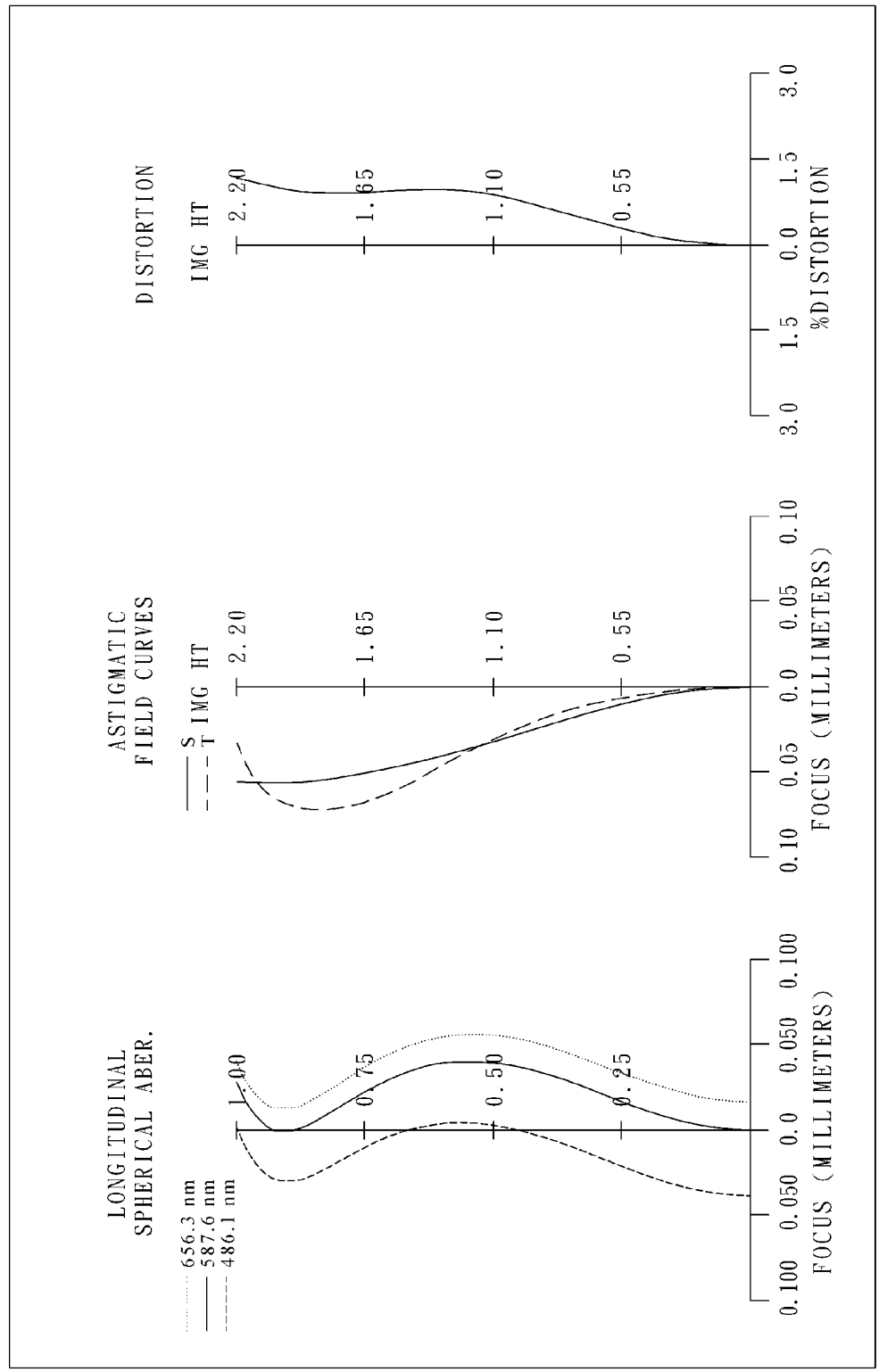
FIG. 1B shows the aberration curves of the first embodiment of the present invention.

FIG. 1A shows an imaging optical lens system in accordance with the first embodiment of the present invention, and FIG. 1B shows the aberration curves of the first embodiment of the present invention. The imaging optical lens system of the first embodiment of the present invention mainly comprises three lens elements with refractive power, in order from an object side to an image side:

a plastic first lens element 110 with positive refractive power having a convex object-side surface 111 and a concave image-side surface 112, the object-side and image-side surfaces 111 and 112 thereof being aspheric;

a plastic second lens element 120 with negative refractive power having a convex object-side surface 121 and a concave image-side surface 122, the object-side and image-side surfaces 121 and 122 thereof being aspheric; and at least one inflection point is positioned on the object-side surface 121 thereof; and a plastic third lens element 130 with negative refractive power having concave object-side surface 131 and a concave image-side surface 132, the object-side and image-side surfaces 131 and 132 thereof being aspheric; wherein the shape of the image-side surface 132 of the third lens element 130 changing from concave when near an optical axis to convex when away from the optical axis;

wherein a stop, can be an aperture stop 100 is disposed between an imaged object and the first lens element 110; the imaging optical lens system further comprises a IR cut-filter 140 disposed between the image-side surface 132 of the third lens element 130 and an image plane 150; the filter 140 is made of glass and has no influence on the focal length of the imaging optical lens system; the imaging optical lens system further comprises an image sensor (figure not shown) provided on the image plane 150.

The detailed optical data of the first embodiment is shown in TABLE 1, and the aspheric surface data is shown in TABLE 2, wherein the units of the radius of curvature, the thickness and the focal length are expressed in mm, and HFOV is half of the maximal field of view.

TABLE 1

(Embodiment 1)
f = 3.53 mm, Fno = 2.78, HFOV = 31.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.099 | | | | |
| 2 | Lens 1 | 1.293 | ASP | 0.733 | Plastic | 1.544 | 55.9 | 3.12 |
| 3 | | 4.341 | ASP | 0.208 | | | | |
| 4 | Lens 2 | 2.138 | ASP | 0.300 | Plastic | 1.640 | 23.3 | −19.55 |
| 5 | | 1.726 | ASP | 0.418 | | | | |
| 6 | Lens 3 | −100.000 | ASP | 1.485 | Plastic | 1.544 | 55.9 | −10.86 |
| 7 | | 6.311 | ASP | 0.300 | | | | |
| 8 | IR-filter | Plano | | 0.200 | Glass | 1.517 | 64.2 | — |
| 9 | | Plano | | 0.356 | | | | |
| 10 | Image | Plano | | — | | | | |

* Reference wavelength for Focal length and Index calculation is 587.6 nm

TABLE 2

Aspheric Coefficients

| | Surface # | | | | | |
|---|---|---|---|---|---|---|
| | 2 | 3 | 4 | 5 | 6 | 7 |
| k = | −4.6086E−01 | −1.7170E+01 | −1.9620E+01 | −1.1187E+01 | −1.0000E+00 | 1.5877E+00 |
| A4 = | −1.5999E−02 | −1.7437E−01 | −7.9162E−02 | 1.0484E−01 | −1.8240E−01 | −6.7029E−02 |
| A6 = | 6.2053E−02 | −3.7469E−02 | −8.7437E−03 | 6.7745E−02 | 6.9256E−02 | 9.1321E−03 |
| A8 = | −2.7803E−01 | −5.2299E−01 | −1.0876E+00 | −2.6934E−01 | 3.5020E−03 | −3.8509E−03 |
| A10 = | 5.2379E−01 | −8.9667E−02 | 7.6353E−01 | 1.7933E−01 | 7.4167E−03 | 5.9023E−04 |
| A12 = | −5.7888E−01 | 5.3004E−01 | −2.8875E−01 | 1.3032E−01 | 3.3846E−03 | 6.5978E−05 |
| A14 = | −5.6824E−01 | −3.7201E−01 | −2.0166E+00 | −1.2127E−01 | 6.5577E−04 | −3.7101E−05 |

The equation of the aspheric surface profiles is expressed as follows:

$$X(Y) = (Y^2/R)/(1 + \text{sqrt}(1 - (1+k)*(Y/R)^2)) + \sum_i (Ai)*(Y^i)$$

wherein:

X: the distance of a point on the aspheric surface at a distance Y from the optical axis relative to the tangential plane at the aspheric surface vertex;

Y: the distance from the point on the curve of the aspheric surface to the optical axis;

R: curvature radius;

k: the conic coefficient;

Ai: the aspheric coefficient of order i.

In the first embodiment of the present imaging optical lens system, the focal length of the imaging optical lens system is f, and it satisfies the following relation: f=3.53 (mm).

In the first embodiment of the present imaging optical lens system, the f-number of the imaging optical lens system is Fno, and it satisfies the relation: Fno=2.78.

In the first embodiment of the present imaging optical lens system, half of the maximal field of view of the imaging optical lens system is HFOV, and it satisfies the relation: HFOV=31.5 deg.

In the first embodiment of the present imaging optical lens system, an Abbe number of the first lens element 110 is V1, an Abbe number of the second lens element 120 is V2, and they satisfy the following relation: (V1+V2)/(V1−V2)=2.43.

In the first embodiment of the present imaging optical lens system, the Abbe number of the first lens element 110 is V1, an Abbe number of the third lens element 130 is V3, and they satisfy the following relation: V1/V3=1.00.

In the first embodiment of the present imaging optical lens system, a central thickness of the first lens element 110 is CT1, a central thickness of the second lens element 120 is CT2, a central thickness of the third lens element 130 is CT3, and they satisfy the following relation: (CT1+CT2)/CT3=0.70.

In the first embodiment of the present imaging optical lens system, a curvature radius of the object-side surface 111 of the first lens element 110 is R1, a curvature radius of the image-side surface 112 of the first lens element 110 is R2, and they satisfy the following relation: |R1/R2|=0.30.

In the first embodiment of the present imaging optical lens system, a curvature radius of the image-side surface 122 of the second lens element 120 is R4, the focal length of the imaging optical lens system is f, and they satisfy the following relation: R4/f=0.49.

In the first embodiment of the present imaging optical lens system, a curvature radius of the object-side surface 121 of the second lens element 120 is R3, a curvature radius of the image-side surface 122 of the second lens element 120 is R4, and they satisfy the following relation: (R3−R4)/(R3+R4)=0.11.

In the first embodiment of the present imaging optical lens system, a curvature radius of the image-side surface 132 of the third lens element 130 is R6, a curvature radius of the object-side surface 131 of the third lens element 130 is R5, and they satisfy the following relation: R6/R5=−0.06.

In the first embodiment of the present imaging optical lens system, the focal length of the imaging optical lens system is f, a focal length of the first lens element 110 is f1, and they satisfy the following relation: f/f1=1.13.

In the first embodiment of the present imaging optical lens system, a focal length of the third lens element 130 is f3, a focal length of the second lens element 120 is f2, and they satisfy the following relation: f3/f2=0.55.

In the first embodiment of the present imaging optical lens system, an axial distance between the image-side surface 132 of the third lens element 130 and the image plane 150 is BL, the focal length of the imaging optical lens system is f, and they satisfy the following relation: BL/f=0.24.

In the first embodiment of the present imaging optical lens system, a distance in parallel with an optical axis from an axial vertex on the object-side surface 121 of the second lens element 120 to a maximal effective diameter position on the object-side surface 121 of the second lens element 120 is SAG21, the central thickness of the second lens element 120 is CT2, and they satisfy the following relation: SAG21/CT2=0.00.

Embodiment 2

Figure 2A:
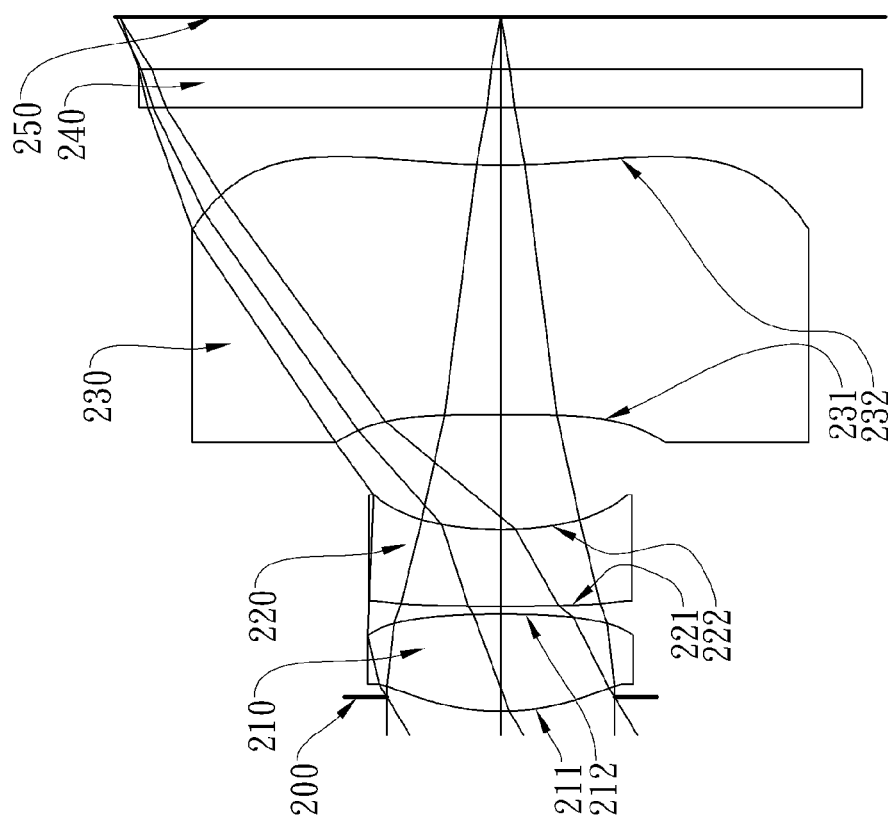
FIG. 2A shows an imaging optical lens system in accordance with a second embodiment of the present invention.
Figure 2B:
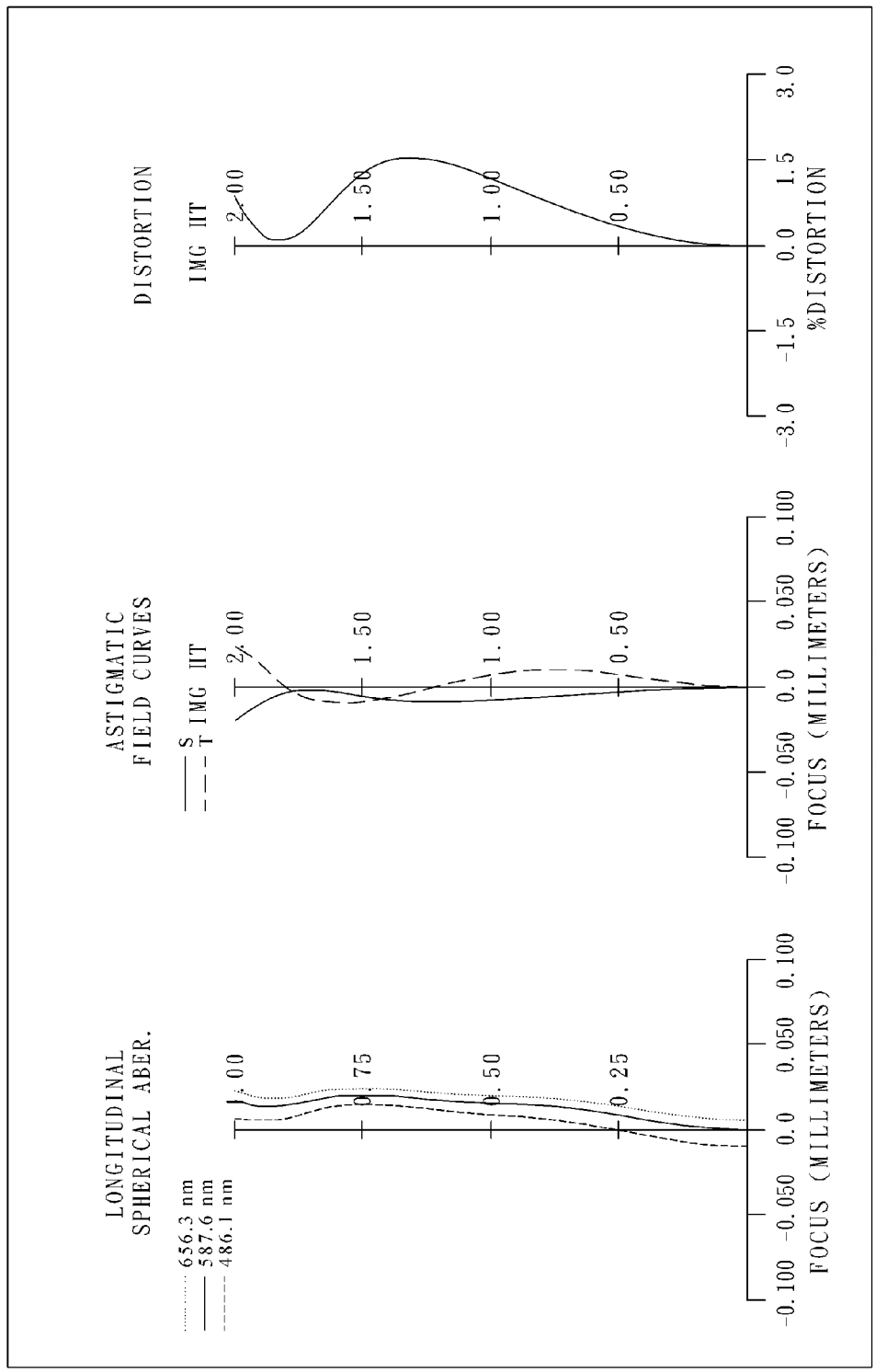
FIG. 2B shows the aberration curves of the second embodiment of the present invention.

FIG. 2A shows an imaging optical lens system in accordance with the second embodiment of the present invention, and FIG. 2B shows the aberration curves of the second embodiment of the present invention. The imaging optical lens system of the second embodiment of the present invention mainly comprises three lens elements with refractive power, in order from an object side to an image side:

a plastic first lens element 210 with positive refractive power having a convex object-side surface 211 and a convex image-side surface 212, the object-side and image-side surfaces 211 and 212 thereof being aspheric;

a plastic second lens element 220 with negative refractive power having a convex object-side surface 221 and a concave image-side surface 222, the object-side and image-side surfaces 221 and 222 thereof being aspheric; and at least one inflection point is positioned on the object-side surface 221 thereof; and a plastic third lens element 230 with negative refractive power having concave object-side surface 231 and a concave image-side surface 232, the object-side and image-side surfaces 231 and 232 thereof being aspheric; wherein the shape of the image-side surface 232 of the third lens element 230 changing from concave when near an optical axis to convex when away from the optical axis;

wherein an aperture stop 200 is disposed between an imaged object and the first lens element 210; the imaging optical lens system further comprises a IR cut-filter 240 disposed between the image-side surface 232 of the third lens element 230 and an image plane 250; the filter 240 is made of glass and has no influence on the focal length of the imaging optical lens system; the imaging optical lens system further comprises an image sensor (figure not shown) provided on the image plane 250.

The detailed optical data of the second embodiment is shown in TABLE 3, and the aspheric surface data is shown in TABLE 4, wherein the units of the radius of curvature, the thickness and the focal length are expressed in mm, and HFOV is half of the maximal field of view.

TABLE 3

(Embodiment 2)
f = 3.29 mm, Fno = 2.78, HFOV = 31.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.076 | | | | |
| 2 | Lens 1 | 1.216 | ASP | 0.507 | Plastic | 1.544 | 55.9 | 1.91 |
| 3 | | −6.192 | ASP | 0.040 | | | | |
| 4 | Lens 2 | 9.650 | ASP | 0.400 | Plastic | 1.640 | 23.3 | −3.63 |
| 5 | | 1.840 | ASP | 0.597 | | | | |
| 6 | Lens 3 | −100.000 | ASP | 1.300 | Plastic | 1.544 | 55.9 | −6.54 |
| 7 | | 3.707 | ASP | 0.300 | | | | |
| 8 | IR-filter | Plano | | 0.200 | Glass | 1.517 | 64.2 | |
| 9 | | Plano | | 0.269 | | | | |
| 10 | Image | Plano | | — | | | | |

* Reference wavelength for Focal length and Index calculation is 587.6 nm

TABLE 4

Aspheric Coefficients

| | Surface # | | | | | |
|---|---|---|---|---|---|---|
| | 2 | 3 | 4 | 5 | 6 | 7 |
| k = | −7.7432E−01 | 3.0000E+00 | −2.0000E+01 | −9.5330E+00 | −1.0000E+00 | −2.8634E+00 |
| A4 = | −4.3820E−02 | −3.0400E−01 | −1.5593E−01 | 2.8662E−01 | −2.8420E−01 | −1.2165E−01 |
| A6 = | 1.7328E−02 | 3.5222E−01 | 7.9628E−01 | 3.5448E−01 | 1.1099E−01 | 4.4649E−02 |
| A8 = | −1.1227E+00 | −2.3576E−01 | −7.7688E−01 | −1.8335E−01 | 2.1462E−02 | −1.8527E−02 |
| A10 = | 1.5065E+00 | −6.6426E−01 | 1.4874E+00 | 1.0535E+00 | −3.2154E−01 | 1.4309E−03 |
| A12 = | 1.9393E+00 | −1.0358E+00 | −5.2055E+00 | 9.0424E−01 | −1.3121E−01 | 3.5779E−05 |
| A14 = | −7.9442E+00 | −1.2070E−01 | 3.5158E+00 | −5.3694E+00 | 4.6461E−01 | 3.7223E−05 |

The equation of the aspheric surface profiles of the second embodiment has the same form as that of the first embodiment. Moreover, the description of the factors in the relations is as those set forth in the first embodiment, but the values of the relations of the second embodiment are listed in the following TABLE 5.

TABLE 5

(Embodiment 2)

| f [mm] | 3.29 | R4/f | 0.56 |
|---|---|---|---|
| Fno | 2.78 | (R3 − R4)/(R3 + R4) | 0.68 |
| HFOV [deg.] | 31.0 | R6/R5 | −0.04 |
| (V1 + V2)/(V1 − V2) | 2.43 | f/f1 | 1.72 |
| V1/V3 | 1.00 | f3/f2 | 1.80 |
| (CT1 + CT2)/CT3 | 0.70 | BL/f | 0.23 |
| |R1/R2| | 0.20 | SAG21/CT2 | 0.07 |

Embodiment 3

Figure 3A:
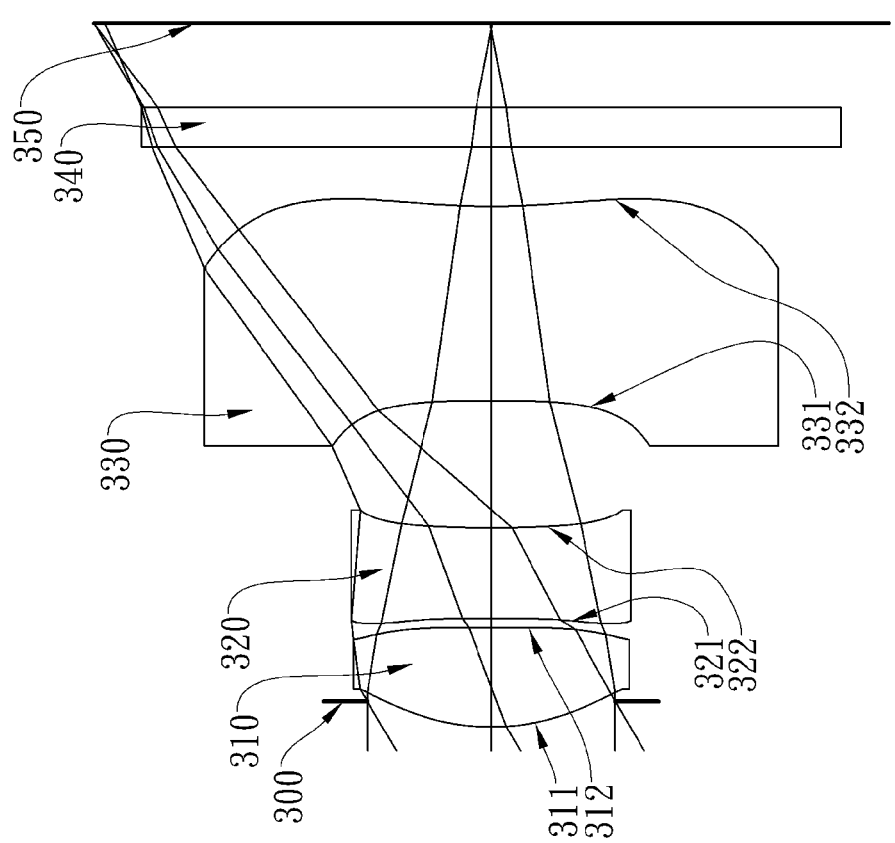
FIG. 3A shows an imaging optical lens system in accordance with a third embodiment of the present invention.
Figure 3B:
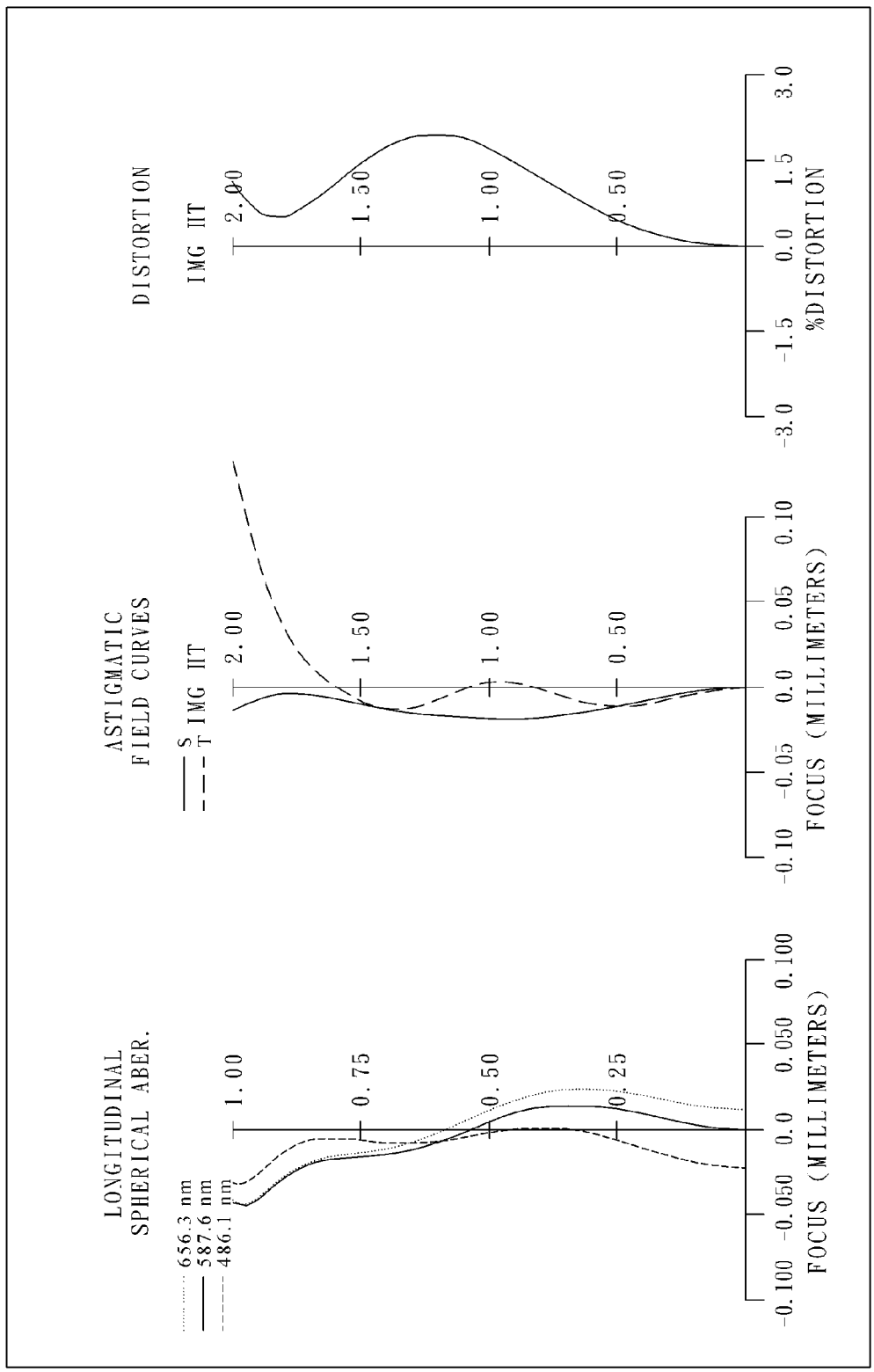
FIG. 3B shows the aberration curves of the third embodiment of the present invention.

FIG. 3A shows an imaging optical lens system in accordance with the third embodiment of the present invention, and FIG. 3B shows the aberration curves of the third embodiment of the present invention. The imaging optical lens system of the third embodiment of the present invention mainly comprises three lens elements with refractive power, in order from an object side to an image side:

a plastic first lens element 310 with positive refractive power having a convex object-side surface 311 and a concave image-side surface 312, the object-side and image-side surfaces 311 and 312 thereof being aspheric;

a plastic second lens element 320 with negative refractive power having a flat object-side surface 321 at a paraxial region and a concave image-side surface 322, the object-side and image-side surfaces 321 and 322 thereof being aspheric; and at least one inflection point is positioned on the object-side surface 321 thereof; and a plastic third lens element 330 with negative refractive power having concave object-side surface 331 and a concave image-side surface 332, the object-side and image-side surfaces 331 and 332 thereof being aspheric; wherein the shape of the image-side surface 332 of the third lens element 330 changing from concave when near an optical axis to convex when away from the optical axis;

wherein an aperture stop 300 is disposed between an imaged object and the first lens element 310; the imaging optical lens system further comprises a IR cut-filter 340 disposed between the image-side surface 332 of the third lens element 330 and an image plane 350; the filter 340 is made of glass and has no influence on the focal length of the imaging optical lens system; the imaging optical lens system further comprises an image sensor (figure not shown) provided on the image plane 350.

The detailed optical data of the third embodiment is shown in TABLE 6, and the aspheric surface data is shown in TABLE 7, wherein the units of the radius of curvature, the thickness and the focal length are expressed in mm, and HFOV is half of the maximal field of view.

TABLE 6

(Embodiment 3)
f = 3.37 mm, Fno = 2.70, HFOV = 30.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.129 | | | | |
| 2 | Lens 1 | 1.102 | ASP | 0.497 | Plastic | 1.544 | 55.9 | 2.30 |
| 3 | | 7.791 | ASP | 0.050 | | | | |
| 4 | Lens 2 | ∞ | ASP | 0.455 | Plastic | 1.650 | 21.4 | −8.63 |
| 5 | | 5.606 | ASP | 0.641 | | | | |
| 6 | Lens 3 | −15.728 | ASP | 0.978 | Plastic | 1.535 | 56.3 | −5.09 |
| 7 | | 3.361 | ASP | 0.300 | | | | |
| 8 | IR-filter | Plano | | 0.200 | Glass | 1.517 | 64.2 | — |
| 9 | | Plano | | 0.426 | | | | |
| 10 | Image | Plano | | — | | | | |

* Reference wavelength for Focal length and Index calculation is 587.6 nm

TABLE 7

Aspheric Coefficients

| | Surface # | | | | | |
|---|---|---|---|---|---|---|
| | 2 | 3 | 4 | 5 | 6 | 7 |
| k = | −5.2920E−01 | 2.0807E+00 | −1.0000E+00 | −2.2670E−01 | −1.0000E+00 | −2.0000E+01 |
| A4 = | −3.5138E−02 | −7.5721E−01 | −6.5971E−01 | −4.4717E−02 | −3.2612E−01 | −1.0437E−01 |
| A6 = | 1.9728E−01 | 7.3452E−01 | 1.2953E+00 | 6.2326E−01 | −3.0635E−01 | 1.1741E−02 |
| A8 = | −8.9011E−01 | 9.9777E−01 | −3.0731E−01 | 1.9986E−01 | 5.2922E−01 | −1.5998E−02 |
| A10 = | 3.3395E−01 | −2.0375E+00 | 1.5392E+00 | −1.1370E+00 | 1.0125E−01 | 1.2904E−02 |
| A12 = | 1.4696E+00 | −1.8619E+00 | −4.5889E+00 | 1.1281E+00 | −2.4415E+00 | −7.0524E−03 |
| A14 = | −3.0373E+00 | 4.5169E+00 | 4.4162E+00 | 3.7208E+00 | 1.6963E+00 | 1.2383E−03 |

The equation of the aspheric surface profiles of the third embodiment has the same form as that of the first embodiment. Moreover, the description of the factors in the relations is as those set forth in the first embodiment, but the values of the relations of the third embodiment are listed in the following TABLE 8.

TABLE 8

(Embodiment 3)

| f [mm] | 3.37 | R4/f | 1.66 |
|---|---|---|---|
| Fno | 2.70 | (R3 − R4)/(R3 + R4) | 1.00 |
| HFOV [deg.] | 30.5 | R6/R5 | −0.21 |
| (V1 + V2)/(V1 − V2) | 2.24 | f/f1 | 1.47 |
| V1/V3 | 0.99 | f3/f2 | 0.59 |
| (CT1 + CT2)/CT3 | 0.97 | BL/f | 0.27 |
| |R1/R2| | 0.14 | SAG21/CT2 | −0.03 |

Embodiment 4

Figure 4A:
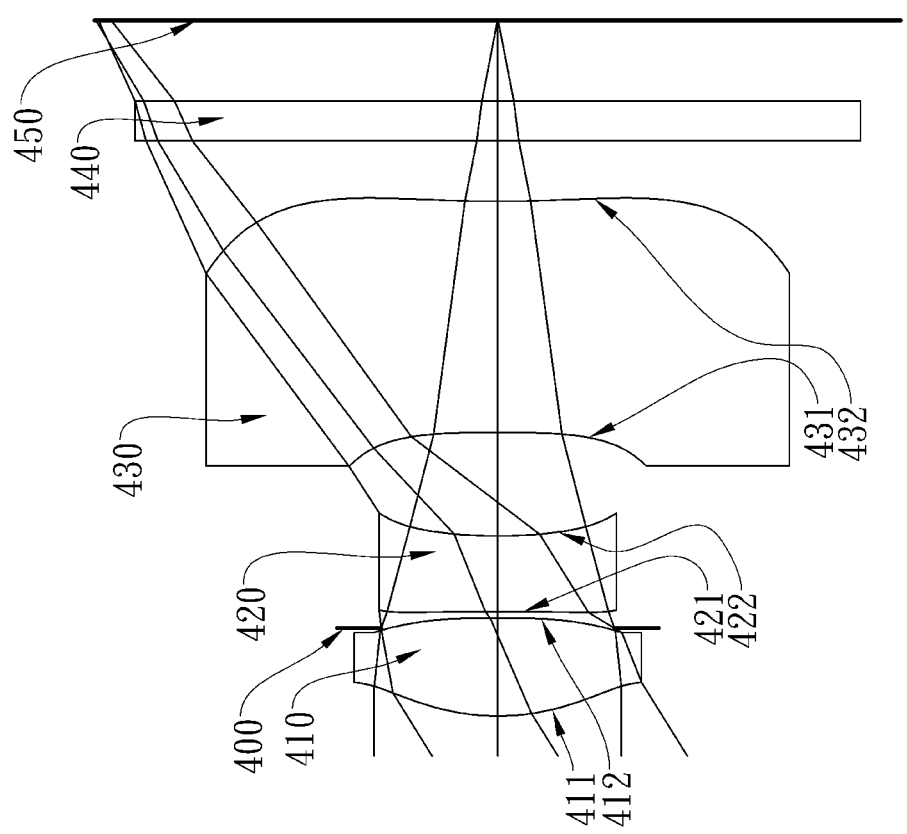
FIG. 4A shows an imaging optical lens system in accordance with a fourth embodiment of the present invention.
Figure 4B:
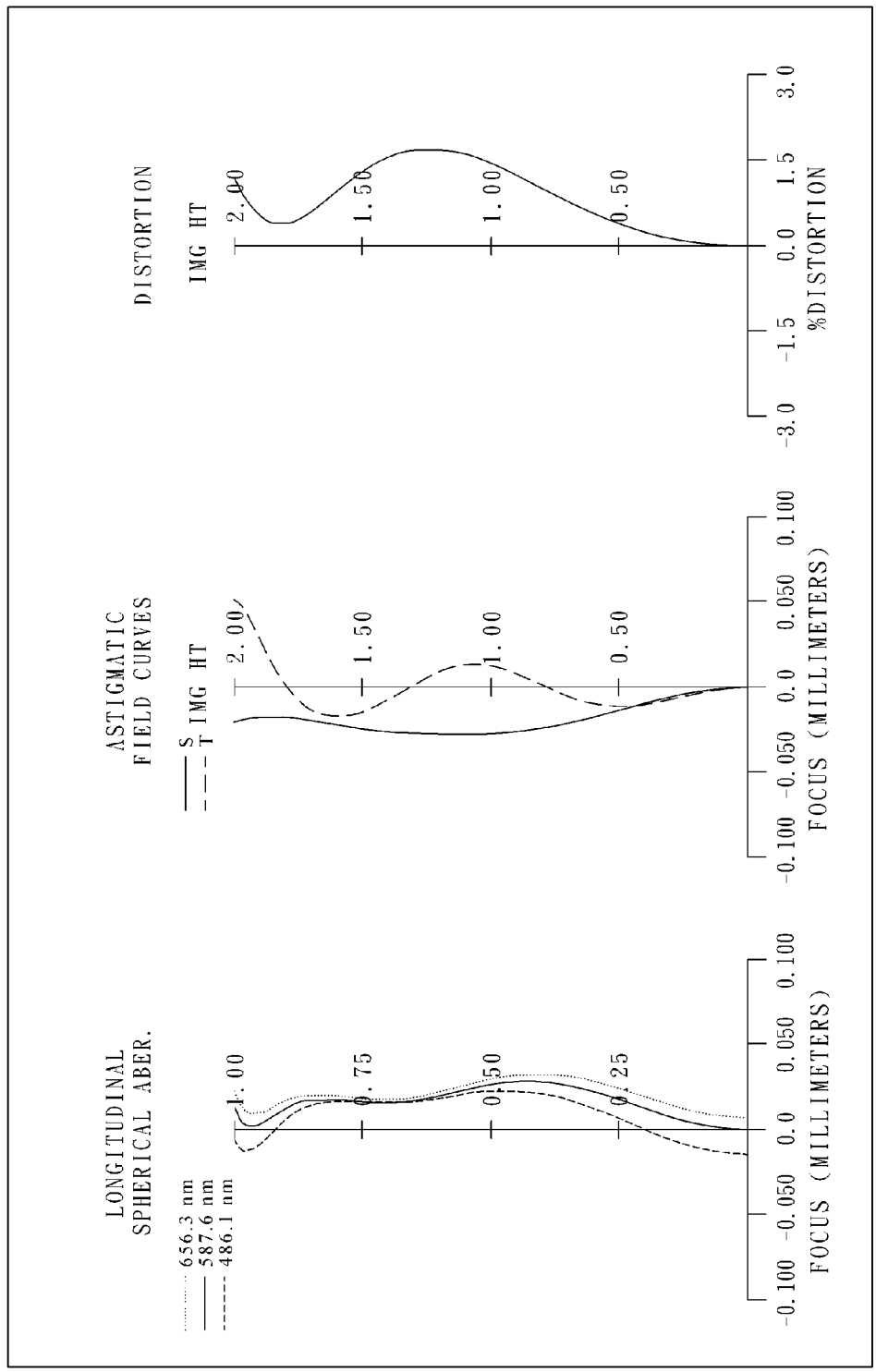
FIG. 4B shows the aberration curves of the fourth embodiment of the present invention.

FIG. 4A shows an imaging optical lens system in accordance with the fourth embodiment of the present invention, and FIG. 4B shows the aberration curves of the fourth embodiment of the present invention. The imaging optical lens system of the fourth embodiment of the present invention mainly comprises three lens elements with refractive power, in order from an object side to an image side:

a plastic first lens element 410 with positive refractive power having a convex object-side surface 411 and a convex image-side surface 412, the object-side and image-side surfaces 411 and 412 thereof being aspheric;

a plastic second lens element 420 with negative refractive power having a convex object-side surface 421 and a concave image-side surface 422, the object-side and image-side surfaces 421 and 422 thereof being aspheric; and at least one inflection point is positioned on the object-side surface 421 thereof; and a plastic third lens element 430 with negative refractive power having concave object-side surface 431 and a concave image-side surface 432, the object-side and image-side surfaces 431 and 432 thereof being aspheric; wherein the shape of the image-side surface 432 of the third lens element 430 changing from concave when near an optical axis to convex when away from the optical axis;

wherein an aperture stop 400 is disposed between the first lens element 410 and the second lens element 420; the imaging optical lens system further comprises a IR cut-filter 440 disposed between the image-side surface 432 of the third lens element 430 and an image plane 450; the filter 440 is made of glass and has no influence on the focal length of the imaging optical lens system; the imaging optical lens system further comprises an image sensor (figure not shown) provided on the image plane 450.

The detailed optical data of the fourth embodiment is shown in TABLE 9, and the aspheric surface data is shown in TABLE 10 wherein the units of the radius of curvature, the thickness and the focal length are expressed in mm, and HFOV is half of the maximal field of view.

TABLE 9

(Embodiment 4)
f = 3.16 mm, Fno = 2.60, HFOV = 31.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.121 | ASP | 0.487 | Plastic | 1.544 | 55.9 | 1.91 |
| 2 | | −12.475 | ASP | −0.049 | | | | |
| 3 | Ape. Stop | Plano | | 0.080 | | | | |
| 4 | Lens 2 | 15.382 | ASP | 0.378 | Plastic | 1.640 | 23.3 | −4.48 |
| 5 | | 2.393 | ASP | 0.516 | | | | |
| 6 | Lens 3 | −9.669 | ASP | 1.150 | Plastic | 1.544 | 55.9 | −6.56 |
| 7 | | 5.895 | ASP | 0.300 | | | | |
| 8 | IR-filter | Plano | | 0.200 | Glass | 1.517 | 64.2 | — |
| 9 | | Plano | | 0.402 | | | | |
| 10 | Image | Plano | | — | | | | |

* Reference wavelength for Focal length and Index calculation is 587.6 nm

TABLE 10

Aspheric Coefficients

| | Surface # | | | | |
|---|---|---|---|---|---|
| 1 | 2 | 4 | 5 | 6 | 7 |
| k = −7.3736E−01 | −6.4598E+00 | −1.0000E+00 | −1.6607E+00 | −1.0000E+00 | −7.7172E+00 |
| A4 = −6.3997E−02 | −8.1305E−01 | −6.3036E−01 | 2.9072E−02 | −2.9654E−01 | −1.0756E−01 |
| A6 = 1.6885E−01 | 1.4712E+00 | 1.9964E+00 | 1.1928E+00 | −6.4118E−01 | 1.7534E−02 |
| A8 = −1.2720E+00 | 9.5647E−01 | 5.4842E−01 | −3.0006E+00 | 1.9800E+00 | −2.1737E−02 |
| A10 = −6.3340E−01 | −7.0996E+00 | −3.4386E+00 | 4.4463E+00 | −1.3906E+00 | 1.6544E−02 |
| A12 = 2.9614E+00 | 2.4185E+00 | −3.1428E+00 | 2.0395E+01 | −7.1090E+00 | −8.6032E−03 |
| A14 = −1.8078E+00 | 8.3460E+00 | 8.4219E+00 | −4.1541E+01 | 9.2546E+00 | 1.5381E−03 |

The equation of the aspheric surface profiles of the fourth embodiment has the same form as that of the first embodiment. Moreover, the description of the factors in the relations is as those set forth in the first embodiment, but the values of the relations of the fourth embodiment are listed in the following TABLE 11.

TABLE 11

(Embodiment 4)

| f [mm] | 3.16 | R4/f | 0.76 |
|---|---|---|---|
| Fno | 2.60 | (R3 − R4)/(R3 + R4) | 0.73 |
| HFOV [deg.] | 31.9 | R6/R5 | −0.61 |
| (V1 + V2)/(V1 − V2) | 2.43 | f/f1 | 1.65 |
| V1/V3 | 1.00 | f3/f2 | 1.46 |
| (CT1 + CT2)/CT3 | 0.75 | BL/f | 0.29 |
| |R1/R2| | 0.09 | SAG21/CT2 | 0.02 |

Embodiment 5

Figure 5A:
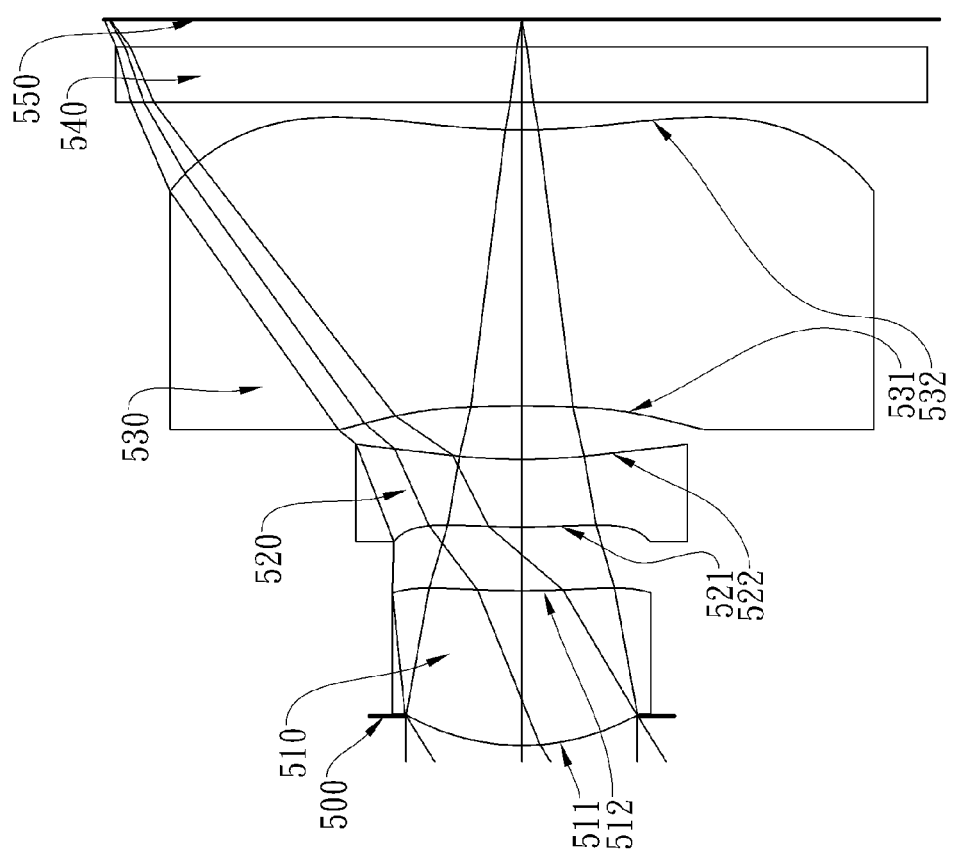
FIG. 5A shows an imaging optical lens system in accordance with a fifth embodiment of the present invention.
Figure 5B:
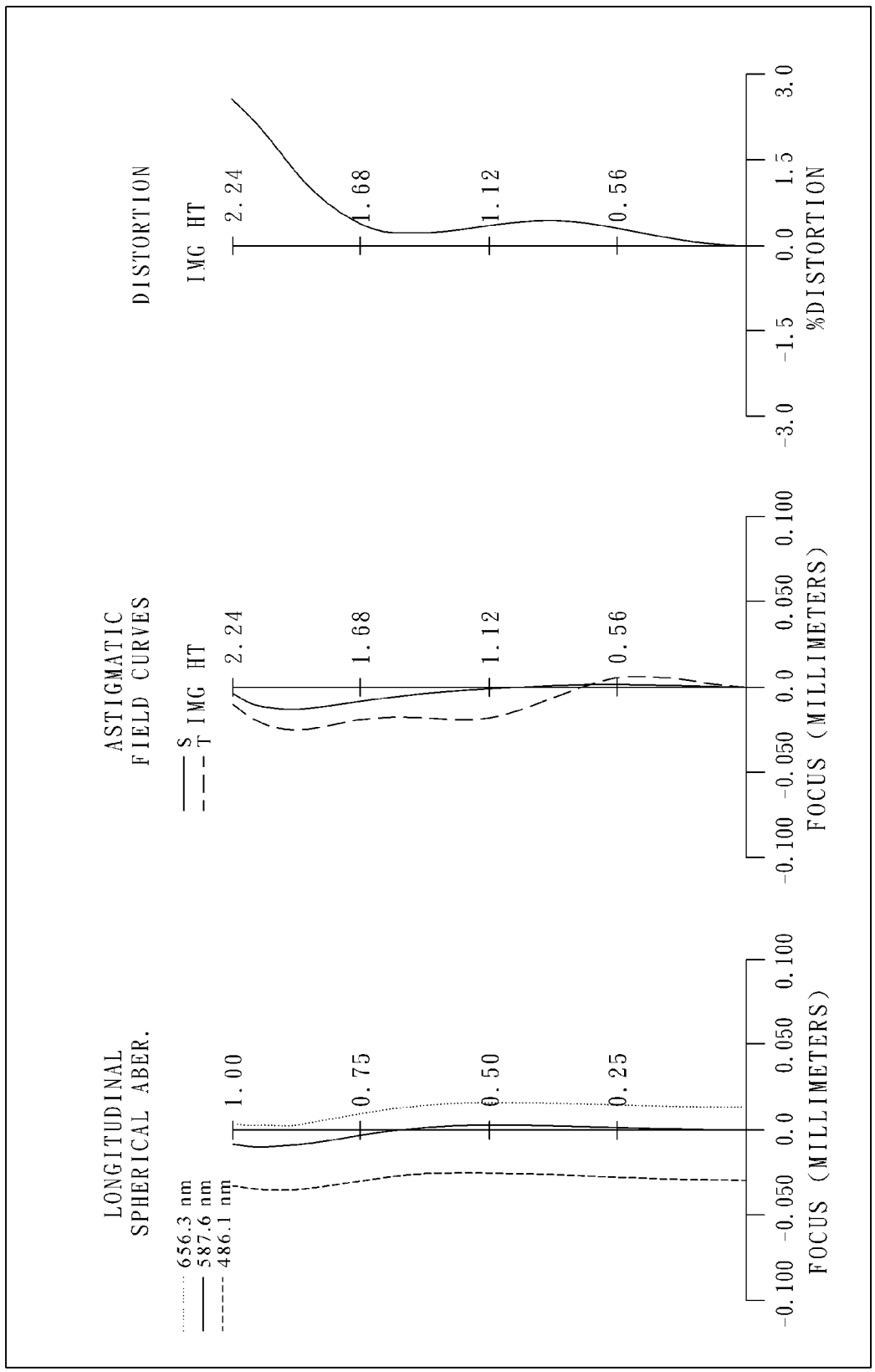
FIG. 5B shows the aberration curves of the fifth embodiment of the present invention.

FIG. 5A shows an imaging optical lens system in accordance with the fifth embodiment of the present invention, and FIG. 5B shows the aberration curves of the fifth embodiment of the present invention. The imaging optical lens system of the fifth embodiment of the present invention mainly comprises three lens elements with refractive power, in order from an object side to an image side:

a plastic first lens element 510 with positive refractive power having a convex object-side surface 511 and a concave image-side surface 512, the object-side and image-side surfaces 511 and 512 thereof being aspheric;

a plastic second lens element 520 with negative refractive power having a convex object-side surface 521 and a concave image-side surface 522, the object-side and image-side surfaces 521 and 522 thereof being aspheric; and at least one inflection point is positioned on the object-side surface 521 and the image-side surface 522 thereof; and a plastic third lens element 530 with negative refractive power having concave object-side surface 531 and a concave image-side surface 532, the object-side and image-side surfaces 531 and 532 thereof being aspheric; wherein the shape of the image-side surface 532 of the third lens element 530 changing from concave when near an optical axis to convex when away from the optical axis;

wherein an aperture stop 500 is disposed between an imaged object and the first lens element 510; the imaging optical lens system further comprises a IR cut-filter 540 disposed between the image-side surface 532 of the third lens element 530 and an image plane 550; the filter 540 is made of glass and has no influence on the focal length of the imaging optical lens system; the imaging optical lens system further comprises an image sensor (figure not shown) provided on the image plane 550.

The detailed optical data of the fifth embodiment is shown in TABLE 12, and the aspheric surface data is shown in TABLE 13, wherein the units of the radius of curvature, the thickness and the focal length are expressed in mm, and HFOV is half of the maximal field of view.

TABLE 12

(Embodiment 5)
f = 3.49 mm, Fno = 2.78, HFOV = 32.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.160 | | | | |
| 2 | Lens 1 | 1.233 | ASP | 0.840 | Plastic | 1.544 | 55.9 | 2.79 |
| 3 | | 4.995 | ASP | 0.346 | | | | |
| 4 | Lens 2 | 4.310 | ASP | 0.367 | Plastic | 1.632 | 23.4 | −13.98 |
| 5 | | 2.802 | ASP | 0.290 | | | | |
| 6 | Lens 3 | −12.723 | ASP | 1.500 | Plastic | 1.583 | 30.2 | −4.43 |
| 7 | | 3.383 | ASP | 0.150 | | | | |
| 8 | IR-filter | Plano | | 0.300 | Glass | 1.517 | 64.2 | — |
| 9 | | Plano | | 0.149 | | | | |
| 10 | Image | Plano | | — | | | | |

\* Reference wavelength for Focal length and Index calculation is 587.6 nm

TABLE 13

Aspheric Coefficients

| | Surface # | | | | | |
|---|---|---|---|---|---|---|
| | 2 | 3 | 4 | 5 | 6 | 7 |
| k = | −3.7690E−01 | −5.2506E+01 | −1.9817E+02 | −3.8591E+01 | −7.1421E+01 | −5.9388E+00 |
| A4 = | 4.5256E−03 | −8.7260E−02 | −4.5955E−02 | −1.6416E−02 | −2.4556E−01 | −7.6248E−02 |
| A6 = | −5.2705E−02 | −5.9783E−02 | −6.2012E−01 | 9.9252E−02 | 1.8471E−01 | 1.3424E−02 |
| A8 = | 1.6009E−01 | −4.6788E−01 | −2.1525E−01 | −3.0837E−01 | −3.9640E−03 | −2.0032E−03 |
| A10 = | −2.9969E−01 | 1.1191E−01 | 1.6989E+00 | 2.4398E−01 | −2.7563E−02 | −6.4315E−04 |
| A12 = | | | −4.9942E+00 | | −1.8495E−02 | 1.7623E−04 |
| A14 = | | | | | −9.5862E−04 | 3.6947E−05 |
| A16 = | | | | | 1.8056E−02 | −1.1109E−05 |

The equation of the aspheric surface profiles of the fifth embodiment has the same form as that of the first embodiment. Moreover, the description of the factors in the relations is as those set forth in the first embodiment, but the values of the relations of the fifth embodiment are listed in the following TABLE 14.

TABLE 14

(Embodiment 5)

| f [mm] | 3.49 | R4/f | 0.80 |
|---|---|---|---|
| Fno | 2.78 | (R3 − R4)/(R3 + R4) | 0.21 |

TABLE 14-continued (Embodiment 5)

| HFOV [deg.] | 32.0 | R6/R5 | −0.27 |
|---|---|---|---|
| (V1 + V2)/(V1 − V2) | 2.44 | f/f1 | 1.25 |
| V1/V3 | 1.85 | f3/f2 | 0.32 |
| (CT1 + CT2)/CT3 | 0.80 | BL/f | 0.17 |
| |R1/R2| | 0.25 | SAG21/CT2 | −0.21 |

Embodiment 6

Figure 6A:
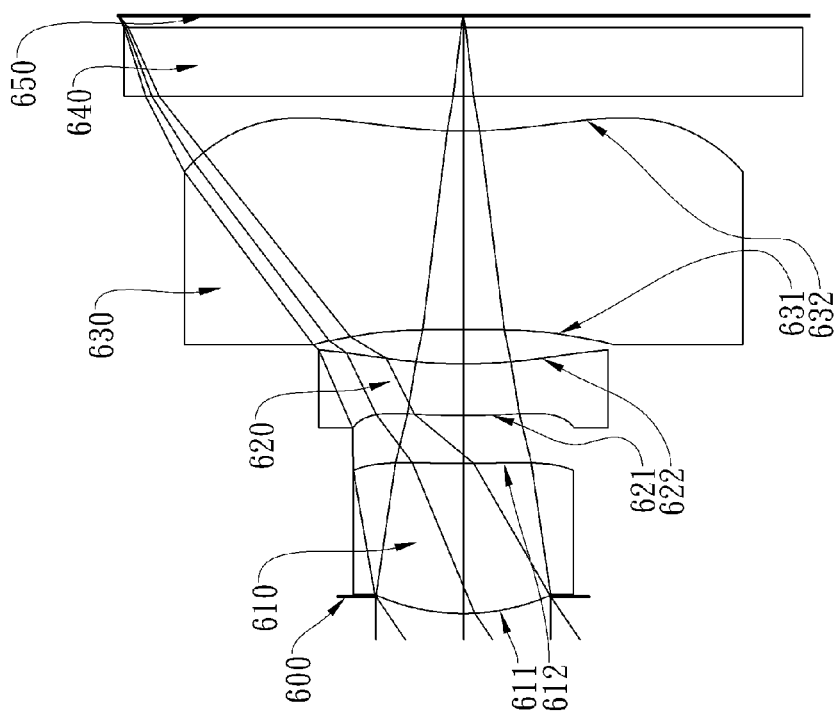
FIG. 6A shows an imaging optical lens system in accordance with a sixth embodiment of the present invention.
Figure 6B:
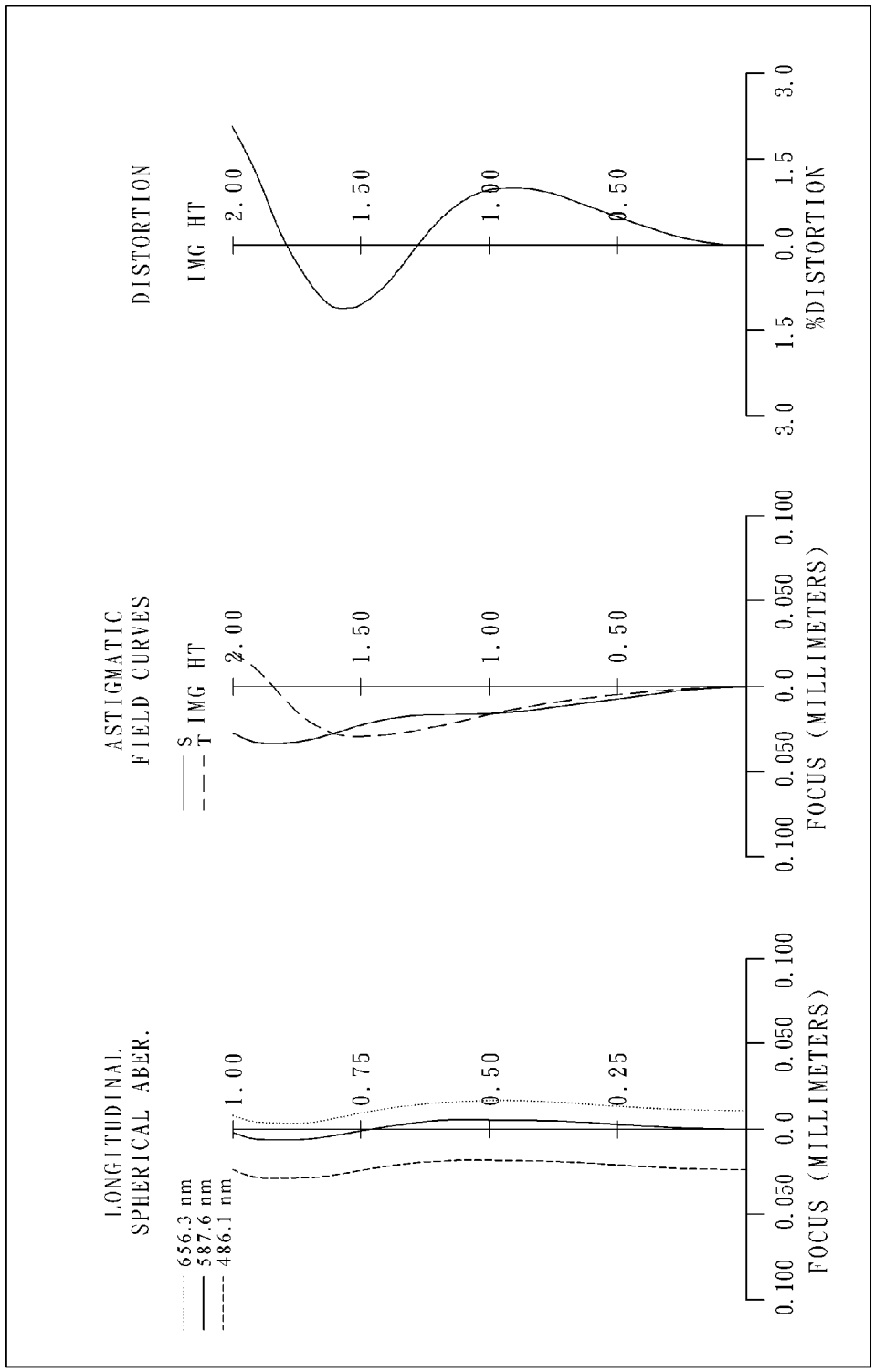
FIG. 6B shows the aberration curves of the sixth embodiment of the present invention.

FIG. 6A shows an imaging optical lens system in accordance with the sixth embodiment of the present invention, and FIG. 6B shows the aberration curves of the sixth embodiment of the present invention. The imaging optical lens system of the sixth embodiment of the present invention mainly comprises three lens elements with refractive power, in order from an object side to an image side:

a plastic first lens element 610 with positive refractive power having a convex object-side surface 611 and a concave image-side surface 612, the object-side and image-side surfaces 611 and 612 thereof being aspheric;

a plastic second lens element 620 with negative refractive power having a convex object-side surface 621 and a concave image-side surface 622, the object-side and image-side surfaces 621 and 622 thereof being aspheric; and at least one inflection point is positioned on the object-side surface 621 and the image-side surface 622 thereof; and a plastic third lens element 630 with negative refractive power having concave object-side surface 631 and a concave image-side surface 632, the object-side and image-side surfaces 631 and 632 thereof being aspheric; wherein the shape of the image-side surface 632 of the third lens element 630 changing from concave when near an optical axis to convex when away from the optical axis;

wherein an aperture stop 600 is disposed between an imaged object and the first lens element 610; the imaging optical lens system further comprises a IR cut-filter 640 disposed between the image-side surface 632 of the third lens element 630 and an image plane 650; the filter 640 is made of glass and has no influence on the focal length of the imaging optical lens system; the imaging optical lens system further comprises an image sensor (figure not shown) provided on the image plane 650.

The detailed optical data of the sixth embodiment is shown in TABLE 15, and the aspheric surface data is shown in TABLE 16, wherein the units of the radius of curvature, the thickness and the focal length are expressed in mm, and HFOV is half of the maximal field of view.

TABLE 15

(Embodiment 6)
f = 2.90 mm, Fno = 2.87, HFOV = 34.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.099 | | | | |
| 2 | Lens 1 | 1.210 | ASP | 0.871 | Plastic | 1.544 | 55.9 | 2.45 |
| 3 | | 9.667 | ASP | 0.277 | | | | |
| 4 | Lens 2 | 4.216 | ASP | 0.300 | Plastic | 1.632 | 23.4 | −17.87 |
| 5 | | 2.986 | ASP | 0.198 | | | | |
| 6 | Lens 3 | −65.020 | ASP | 1.152 | Plastic | 1.583 | 30.2 | −4.47 |
| 7 | | 2.738 | ASP | 0.150 | | | | |
| 8 | IR-filter | Plano | | 0.400 | Glass | 1.517 | 64.2 | — |
| 9 | | Plano | | 0.119 | | | | |
| 10 | Image | Plano | | — | | | | |

* Reference wavelength for Focal length and Index calculation is 587.6 nm

TABLE 16

Aspheric Coefficients

| | Surface # | | | | | |
|---|---|---|---|---|---|---|
| | 2 | 3 | 4 | 5 | 6 | 7 |
| k = | −6.2184E−01 | −7.3210E+01 | −1.4072E+01 | −5.7104E+00 | 1.0000E+01 | −3.6504E+00 |
| A4 = | −3.1140E−03 | −1.3617E−01 | −1.0695E−01 | 2.0465E−02 | −2.8518E−01 | −1.0101E−01 |
| A6 = | 7.0262E−03 | −5.2365E−01 | −7.9837E−01 | −1.2699E−01 | 6.8343E−02 | 7.2453E−03 |
| A8 = | 7.0254E−02 | 7.7949E−02 | −5.4498E−01 | −9.2263E−02 | 3.0950E−01 | 7.5512E−03 |
| A10 = | −7.0471E−01 | −4.9891E−01 | 2.1014E+00 | 1.7714E−01 | 1.4596E−02 | −1.1106E−02 |
| A12 = | | | −1.0489E+01 | | −2.2771E−01 | 2.2720E−03 |
| A14 = | | | | | −6.8555E−02 | 1.2023E−03 |
| A16 = | | | | | 9.9568E−05 | −3.6731E−04 |

The equation of the aspheric surface profiles of the sixth embodiment has the same form as that of the first embodiment. Moreover, the description of the factors in the relations is as those set forth in the first embodiment, but the values of the relations of the sixth embodiment are listed in the following TABLE 17.

TABLE 17

(Embodiment 6)

| f [mm] | 2.90 | R4/f | 1.03 |
|---|---|---|---|
| Fno | 2.87 | (R3 − R4)/(R3 + R4) | 0.17 |
| HFOV [deg.] | 34.1 | R6/R5 | −0.04 |
| (V1 + V2)/(V1 − V2) | 2.44 | f/f1 | 1.18 |
| V1/V3 | 1.85 | f3/f2 | 0.25 |
| (CT1 + CT2)/CT3 | 1.02 | BL/f | 0.23 |
| |R1/R2| | 0.13 | SAG21/CT2 | −0.23 |

Embodiment 7

Figure 7A:
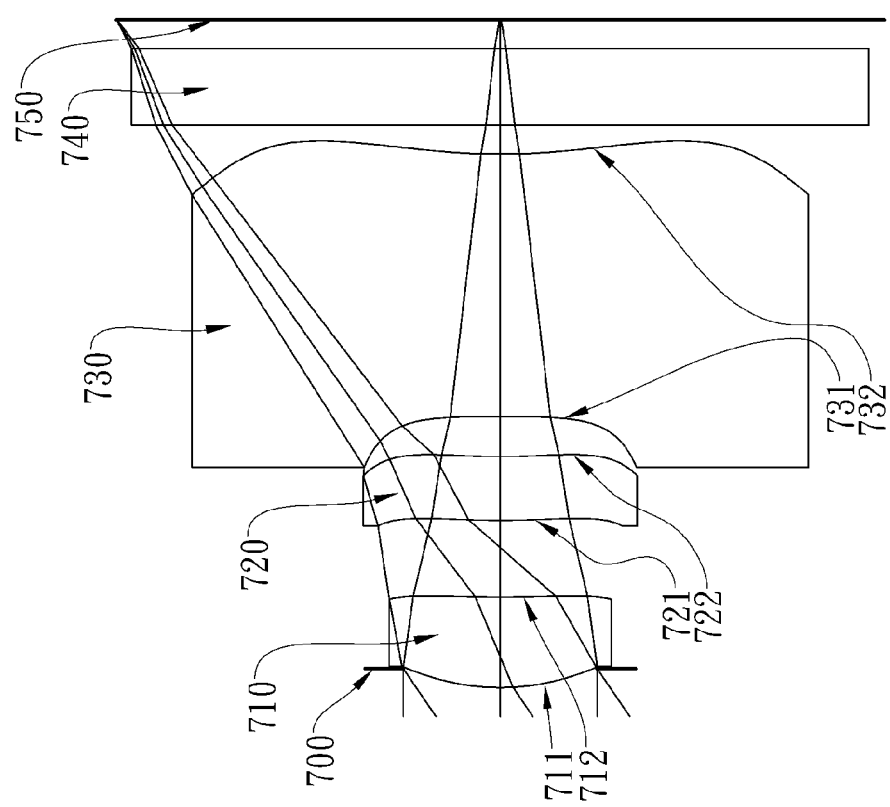
FIG. 7A shows an imaging optical lens system in accordance with a seventh embodiment of the present invention.
Figure 7B:
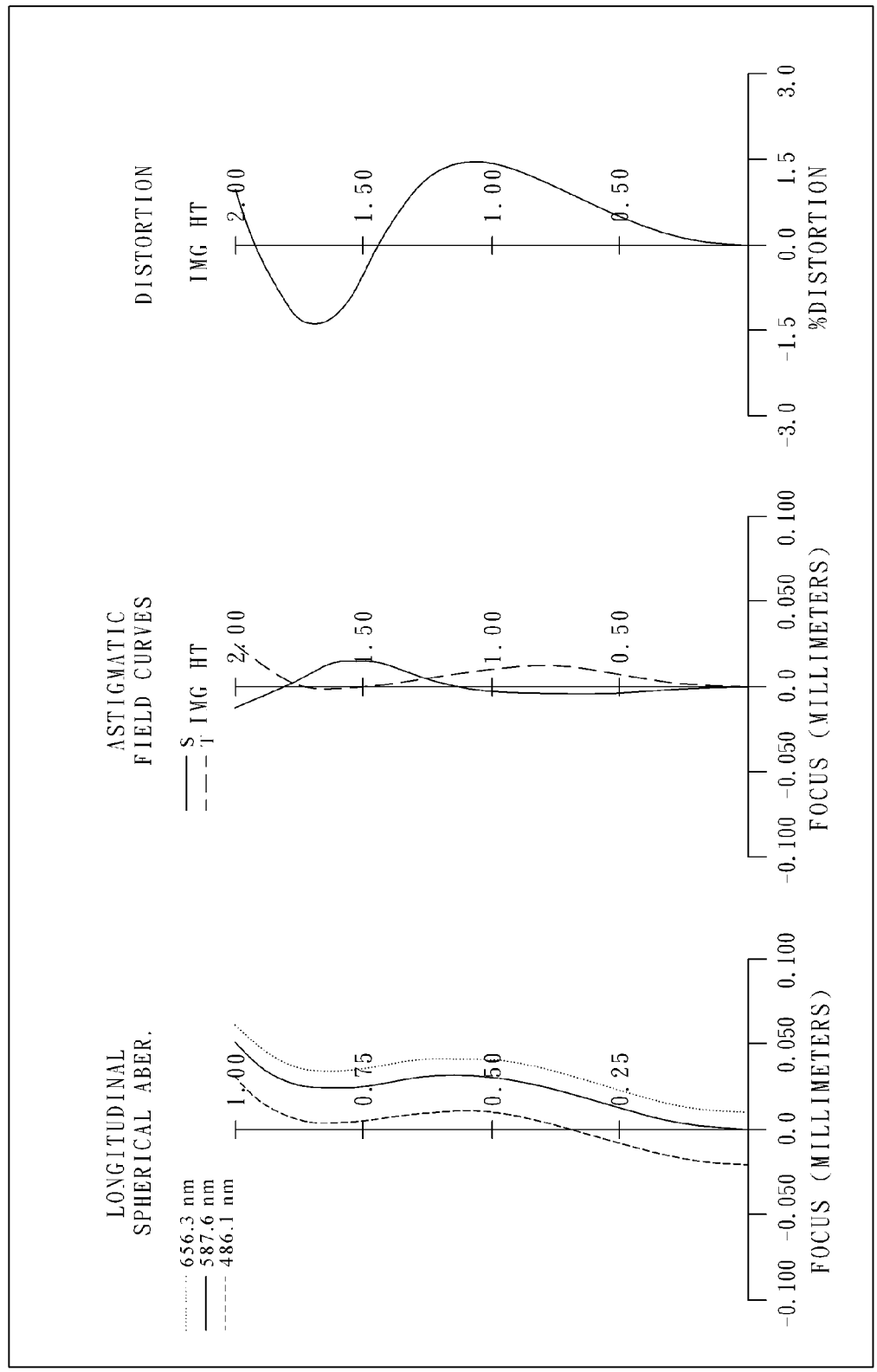
FIG. 7B shows the aberration curves of the seventh embodiment of the present invention.

FIG. 7A shows an imaging optical lens system in accordance with the seventh embodiment of the present invention, and FIG. 7B shows the aberration curves of the seventh embodiment of the present invention. The imaging optical lens system of the seventh embodiment of the present invention mainly comprises three lens elements with refractive power, in order from an object side to an image side:

a plastic first lens element 710 with positive refractive power having a convex object-side surface 711 and a concave image-side surface 712, the object-side and image-side surfaces 711 and 712 thereof being aspheric;

a plastic second lens element 720 with negative refractive power having a convex object-side surface 721 and a concave image-side surface 722, the object-side and image-side surfaces 721 and 722 thereof being aspheric; and at least one inflection point is positioned on both the object-side surface 721 and the image-side surface 722 thereof; and a plastic third lens element 730 with negative refractive power having concave object-side surface 731 and a concave image-side surface 732, the object-side and image-side surfaces 731 and 732 thereof being aspheric; wherein the shape of the image-side surface 732 of the third lens element 730 changing from concave when near an optical axis to convex when away from the optical axis;

wherein an aperture stop 700 is disposed between an imaged object and the first lens element 710; the imaging optical lens system further comprises a IR cut-filter 740 disposed between the image-side surface 732 of the third lens element 730 and an image plane 750; the filter 740 is made of glass and has no influence on the focal length of the imaging optical lens system; the imaging optical lens system further comprises an image sensor (figure not shown) provided on the image plane 750.

The detailed optical data of the seventh embodiment is shown in TABLE 18, and the aspheric surface data is shown in TABLE 19, wherein the units of the radius of curvature, the thickness and the focal length are expressed in mm, and HFOV is half of the maximal field of view.

TABLE 18

(Embodiment 7)
f = 2.90 mm, Fno = 2.87, HFOV = 34.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.099 | | | | |
| 2 | Lens 1 | 1.165 | ASP | 0.472 | Plastic | 1.544 | 55.9 | 2.47 |
| 3 | | 7.559 | ASP | 0.400 | | | | |
| 4 | Lens 2 | 4.066 | ASP | 0.332 | Plastic | 1.544 | 55.9 | −30.39 |
| 5 | | 3.169 | ASP | 0.209 | | | | |
| 6 | Lens 3 | −24.892 | ASP | 1.369 | Plastic | 1.650 | 21.4 | −4.16 |
| 7 | | 3.100 | ASP | 0.150 | | | | |
| 8 | IR-filter | Plano | | 0.400 | Glass | 1.517 | 64.2 | — |
| 9 | | Plano | | 0.150 | | | | |
| 10 | Image | Plano | | — | | | | |

* Reference wavelength for Focal length and Index calculation is 587.6 nm

TABLE 19

Aspheric Coefficients

| | Surface # | | | | | |
|---|---|---|---|---|---|---|
| | 2 | 3 | 4 | 5 | 6 | 7 |
| k = | −8.8476E−01 | −1.2940E+01 | −1.9949E+02 | −1.0000E+02 | 5.3390E+00 | 2.0265E+00 |
| A4 = | −2.1884E−02 | −1.4011E−01 | −7.5137E−02 | −2.6866E−01 | −5.4738E−01 | −1.1414E−01 |
| A6 = | 4.4655E−02 | −3.5370E−01 | −6.5106E−01 | −3.5026E−01 | −8.2896E−02 | 8.0299E−03 |
| A8 = | 2.9759E−02 | 6.7757E−01 | −1.6785E−01 | −3.5995E−01 | −5.8573E−01 | 6.9731E−03 |
| A10 = | −1.8349E+00 | −2.7492E+00 | 3.3307E+00 | −1.8231E−01 | −1.1807E+00 | −1.1845E−02 |
| A12 = | | | −7.8995E+00 | | −1.2046E+00 | 1.8614E−03 |
| A14 = | | | | | −7.1104E−01 | 1.1655E−03 |
| A16 = | | | | | −8.6950E−01 | −2.8531E−04 |

The equation of the aspheric surface profiles of the seventh embodiment has the same form as that of the first embodiment. Moreover, the description of the factors in the relations is as those set forth in the first embodiment, but the values of the relations of the seventh embodiment are listed in the following TABLE 20.

TABLE 20

(Embodiment 7)

| f [mm] | 2.90 | R4/f | 1.09 |
|---|---|---|---|
| Fno | 2.87 | (R3 − R4)/(R3 + R4) | 0.12 |
| HFOV [deg.] | 34.1 | R6/R5 | −0.12 |
| (V1 + V2)/(V1 − V2) | ∞ | f/f1 | 1.17 |
| V1/V3 | 2.61 | f3/f2 | 0.14 |
| (CT1 + CT2)/CT3 | 0.59 | BL/f | 0.24 |
| |R1/R2| | 0.15 | SAG21/CT2 | −0.09 |

Embodiment 8

Figure 8A:
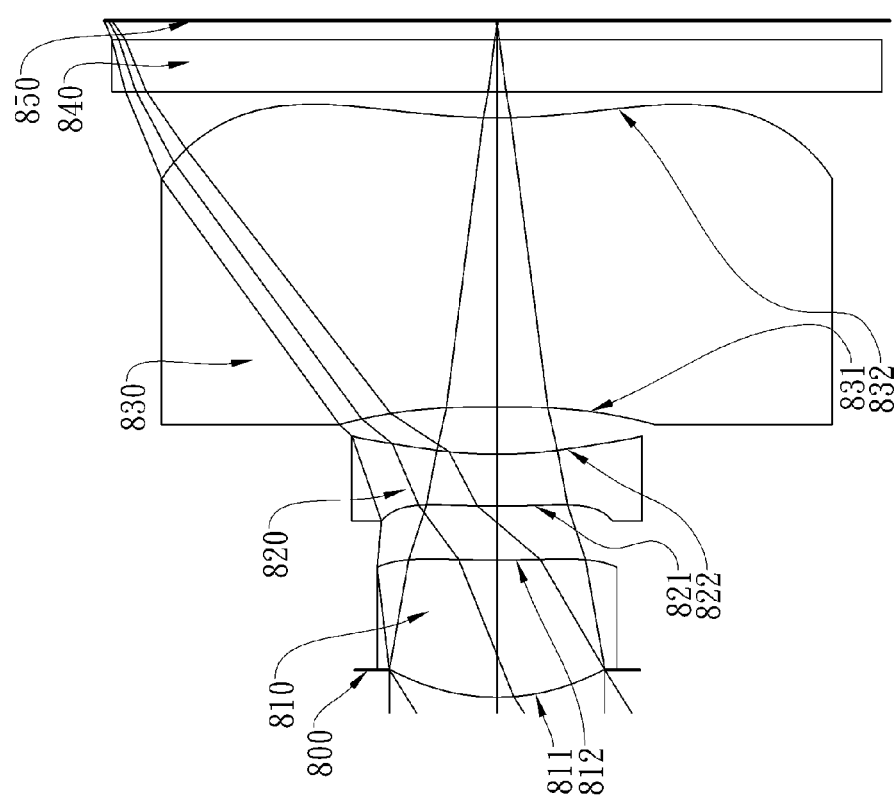
FIG. 8A shows an imaging optical lens system in accordance with an eighth embodiment of the present invention.
Figure 8B:
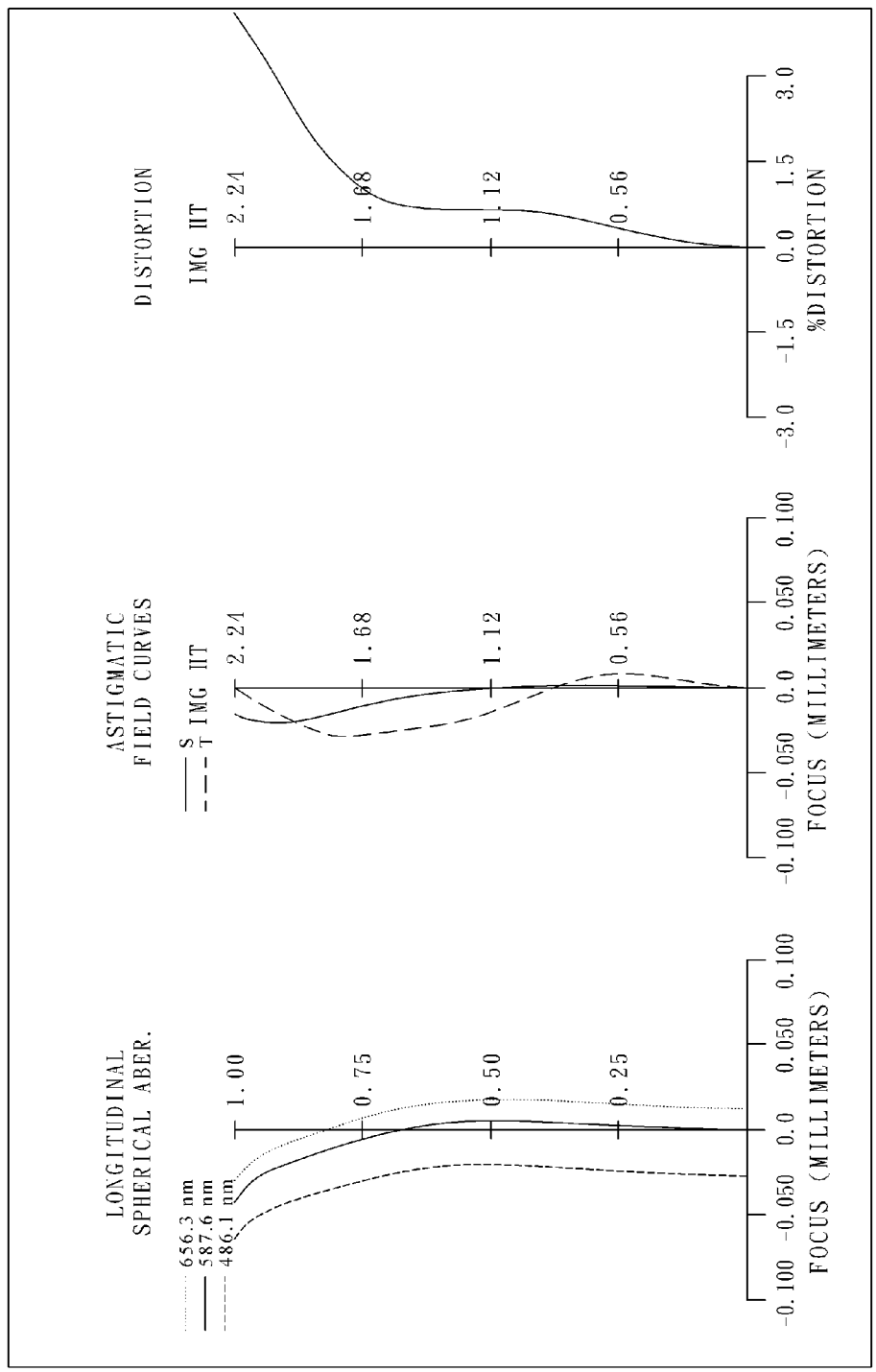
FIG. 8B shows the aberration curves of the eighth embodiment of the present invention.

FIG. 8A shows an imaging optical lens system in accordance with the eighth embodiment of the present invention, and FIG. 8B shows the aberration curves of the eighth embodiment of the present invention. The imaging optical lens system of the eighth embodiment of the present invention mainly comprises three lens elements with refractive power, in order from an object side to an image side:

a glass first lens element 810 with positive refractive power having a convex object-side surface 811 and a concave image-side surface 812, the object-side and image-side surfaces 811 and 812 thereof being aspheric;

a plastic second lens element 820 with negative refractive power having a convex object-side surface 821 and a concave image-side surface 822, the object-side and image-side surfaces 821 and 822 thereof being aspheric; and at least one inflection point is positioned on the object-side surface 821 thereof; and a plastic third lens element 830 with negative refractive power having concave object-side surface 831 and a concave image-side surface 832, the object-side and image-side surfaces 831 and 832 thereof being aspheric; wherein the shape of the image-side surface 832 of the third lens element 830 changing from concave when near an optical axis to convex when away from the optical axis;

wherein an aperture stop 800 is disposed between an imaged object and the first lens element 810; the imaging optical lens system further comprises a IR cut-filter 840 disposed between the image-side surface 832 of the third lens element 830 and an image plane 850; the filter 840 is made of glass and has no influence on the focal length of the imaging optical lens system; the imaging optical lens system further comprises an image sensor (figure not shown) provided on the image plane 850.

The detailed optical data of the eighth embodiment is shown in TABLE 21, and the aspheric surface data is shown in TABLE 22, wherein the units of the radius of curvature, the thickness and the focal length are expressed in mm, and HFOV is half of the maximal field of view.

TABLE 21

(Embodiment 8)
f = 3.45 mm, Fno = 2.78, HFOV = 32.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.159 | | | | |
| 2 | Lens 1 | 1.217 | ASP | 0.792 | Glass | 1.542 | 62.9 | 2.57 |
| 3 | | 7.417 | ASP | 0.310 | | | | |
| 4 | Lens 2 | 4.527 | ASP | 0.300 | Plastic | 1.607 | 26.6 | −8.52 |
| 5 | | 2.354 | ASP | 0.273 | | | | |
| 6 | Lens 3 | −12.357 | ASP | 1.669 | Plastic | 1.544 | 55.9 | −4.85 |
| 7 | | 3.517 | ASP | 0.150 | | | | |
| 8 | IR-filter | Plano | | 0.300 | Glass | 1.517 | 64.2 | — |
| 9 | | Plano | | 0.110 | | | | |
| 10 | Image | Plano | | — | | | | |

\* Reference wavelength for Focal length and Index calculation is 587.6 nm

TABLE 22

Aspheric Coefficients

| | Surface # | | | | | |
|---|---|---|---|---|---|---|
| | 2 | 3 | 4 | 5 | 6 | 7 |
| k = | −4.1071E−01 | −9.9643E+01 | −2.0000E+02 | −2.1507E+01 | −4.1688E+01 | −8.0194E−01 |
| A4 = | 1.5286E−03 | −1.3521E−01 | −1.1225E−01 | −3.9779E−03 | −2.3075E−01 | −7.3614E−02 |
| A6 = | −5.2916E−02 | −1.4284E−01 | −6.5992E−01 | 9.5898E−02 | 1.9670E−01 | 9.2375E−03 |
| A8 = | 1.4346E−01 | −5.2129E−01 | −3.2167E−01 | −3.0843E−01 | 1.3158E−03 | −1.6493E−03 |
| A10 = | −4.1006E−01 | 1.3796E−01 | 9.1603E−01 | 2.6801E−01 | −3.2688E−02 | −6.0045E−04 |
| A12 = | −4.1006E−01 | | −5.0008E+00 | | −2.9666E−02 | 1.4600E−04 |
| A14 = | | | | | −1.4507E−02 | 5.0309E−05 |
| A16 = | | | | | 9.3315E−03 | −1.3084E−05 |

The equation of the aspheric surface profiles of the eighth embodiment has the same form as that of the first embodiment. Moreover, the description of the factors in the relations is as those set forth in the first embodiment, but the values of the relations of the eighth embodiment are listed in the following TABLE 23.

TABLE 23

(Embodiment 8)

| f [mm] | 3.45 | R4/f | 0.68 |
|---|---|---|---|
| Fno | 2.78 | (R3 − R4)/(R3 + R4) | 0.32 |
| HFOV [deg.] | 32.0 | R6/R5 | −0.28 |
| (V1 + V2)/(V1 − V2) | 2.47 | f/f1 | 1.34 |
| V1/V3 | 1.13 | f3/f2 | 0.57 |
| (CT1 + CT2)/CT3 | 0.65 | BL/f | 0.16 |
| |R1/R2| | 0.16 | SAG21/CT2 | −0.28 |

Embodiment 9

Figure 9A:
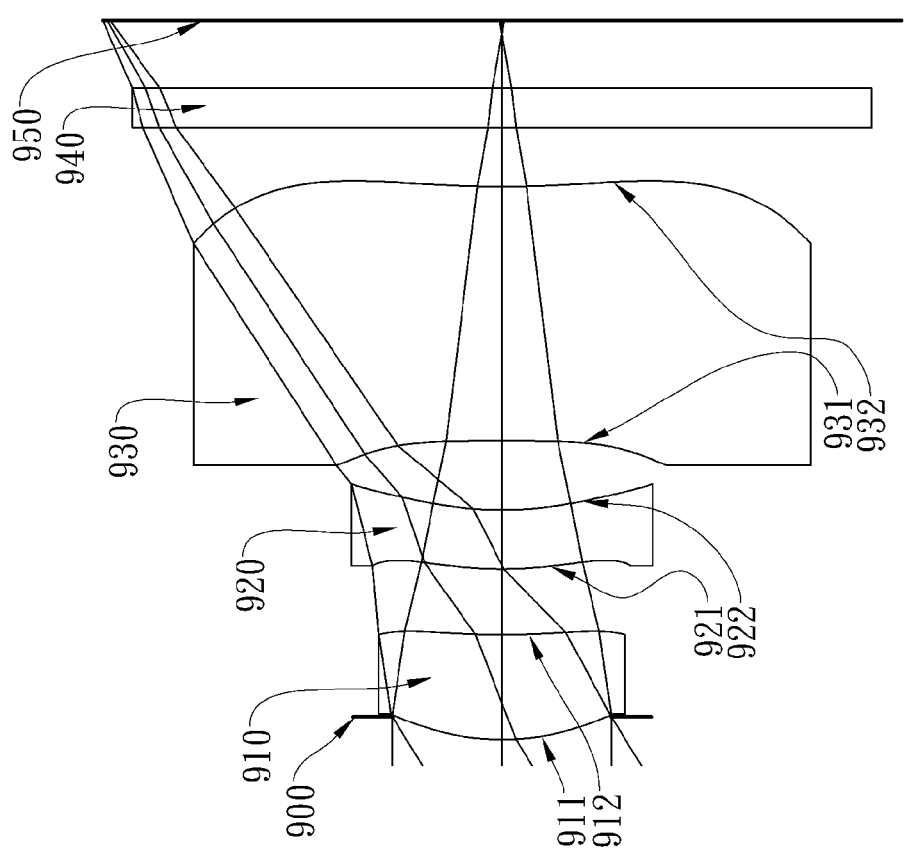
FIG. 9A shows an imaging optical lens system in accordance with a ninth embodiment of the present invention.
Figure 9B:
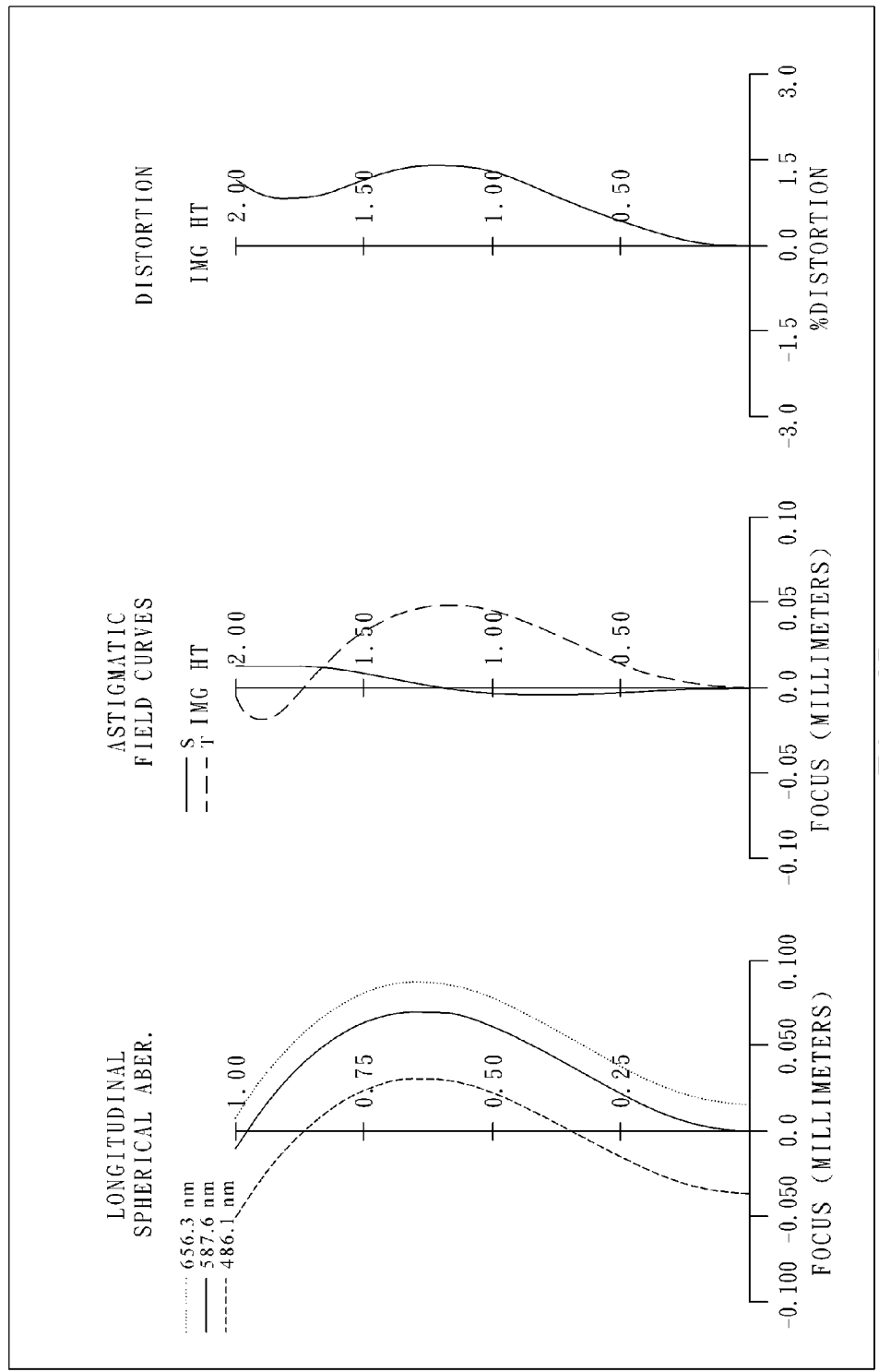
FIG. 9B shows the aberration curves of the ninth embodiment of the present invention.

FIG. 9A shows an imaging optical lens system in accordance with the ninth embodiment of the present invention, and FIG. 9B shows the aberration curves of the ninth embodiment of the present invention. The imaging optical lens system of the ninth embodiment of the present invention mainly comprises three lens elements with refractive power, in order from an object side to an image side:

a plastic first lens element 910 with positive refractive power having a convex object-side surface 911 and a concave image-side surface 912, the object-side and image-side surfaces 911 and 912 thereof being aspheric;

a plastic second lens element 920 with negative refractive power having a convex object-side surface 921 and a concave image-side surface 922, the object-side and image-side surfaces 921 and 922 thereof being aspheric; and at least one inflection point is positioned on the object-side surface 921 thereof; and a plastic third lens element 930 with negative refractive power having concave object-side surface 931 and a concave image-side surface 932, the object-side and image-side surfaces 931 and 932 thereof being aspheric; wherein the shape of the image-side surface 932 of the third lens element 930 changing from concave when near an optical axis to convex when away from the optical axis;

wherein an aperture stop 900 is disposed between an imaged object and the first lens element 910; the imaging optical lens system further comprises a IR cut-filter 940 disposed between the image-side surface 932 of the third lens element 930 and an image plane 950; the filter 940 is made of glass and has no influence on the focal length of the imaging optical lens system; the imaging optical lens system further comprises an image sensor (figure not shown) provided on the image plane 950.

The detailed optical data of the ninth embodiment is shown in TABLE 24, and the aspheric surface data is shown in TABLE 25 wherein the units of the radius of curvature, the thickness and the focal length are expressed in mm, and HFOV is half of the maximal field of view.

TABLE 24

(Embodiment 9)
f = 3.19 mm, Fno = 2.87, HFOV = 31.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.117 | | | | |
| 2 | Lens 1 | 1.196 | ASP | 0.532 | Plastic | 1.544 | 55.9 | 3.03 |
| 3 | | 3.679 | ASP | 0.333 | | | | |
| 4 | Lens 2 | 1.825 | ASP | 0.300 | Plastic | 1.544 | 55.9 | −63.38 |
| 5 | | 1.633 | ASP | 0.351 | | | | |
| 6 | Lens 3 | −103.287 | ASP | 1.292 | Plastic | 1.544 | 55.9 | −8.98 |
| 7 | | 5.150 | ASP | 0.300 | | | | |
| 8 | IR-filter | Plano | | 0.200 | Glass | 1.517 | 64.2 | — |
| 9 | | Plano | | 0.342 | | | | |
| 10 | Image | Plano | | — | | | | |

* Reference wavelength for Focal length and Index calculation is 587.6 nm

TABLE 25

Aspheric Coefficients

| | Surface # | | | | | |
|---|---|---|---|---|---|---|
| | 2 | 3 | 4 | 5 | 6 | 7 |
| k = | −6.9622E−01 | −1.0303E+01 | −1.9677E+01 | −1.4167E+01 | −1.0000E+00 | 4.8843E+00 |
| A4 = | −3.4004E−02 | −1.8021E−01 | −7.6439E−02 | 6.2379E−02 | −2.9523E−01 | −9.1846E−02 |
| A6 = | 6.2968E−02 | −8.5659E−02 | −9.9716E−03 | 1.5491E−02 | 2.6105E−02 | 3.2700E−03 |
| A8 = | −3.7176E−02 | −8.3341E−01 | −1.2383E+00 | −3.0661 E−01 | 8.9417E−03 | −2.6566E−03 |
| A10 = | 2.0722E−01 | 1.9143E−01 | −7.5795E−02 | 2.3196E−01 | −2.7188E−02 | 5.9963E−04 |
| A12 = | −5.7888E−01 | 5.3004E−01 | −2.8875E−01 | 2.9280E−01 | 1.0434E−01 | −1.0006E−04 |
| A14 = | −5.6824E−01 | −3.7201E−01 | −2.0166E+00 | −1.2022E−01 | 7.0009E−02 | −1.0419E−05 |

The equation of the aspheric surface profiles of the ninth embodiment has the same form as that of the first embodiment. Moreover, the description of the factors in the relations is as those set forth in the first embodiment, but the values of the relations of the ninth embodiment are listed in the following TABLE 26.

TABLE 26

(Embodiment 9)

| f [mm] | 3.19 | R4/f | 0.51 |
|---|---|---|---|
| Fno | 2.87 | (R3 − R4)/(R3 + R4) | 0.06 |
| HFOV [deg.] | 31.4 | R6/R5 | −0.05 |
| (V1 + V2)/(V1 − V2) | ∞ | f/f1 | 1.05 |
| V1/V3 | 1.00 | f3/f2 | 0.14 |
| (CT1 + CT2)/CT3 | 0.64 | BL/f | 0.26 |
| |R1/R2| | 0.32 | SAG21/CT2 | 0.05 |

Embodiment 10

Figure 10A:
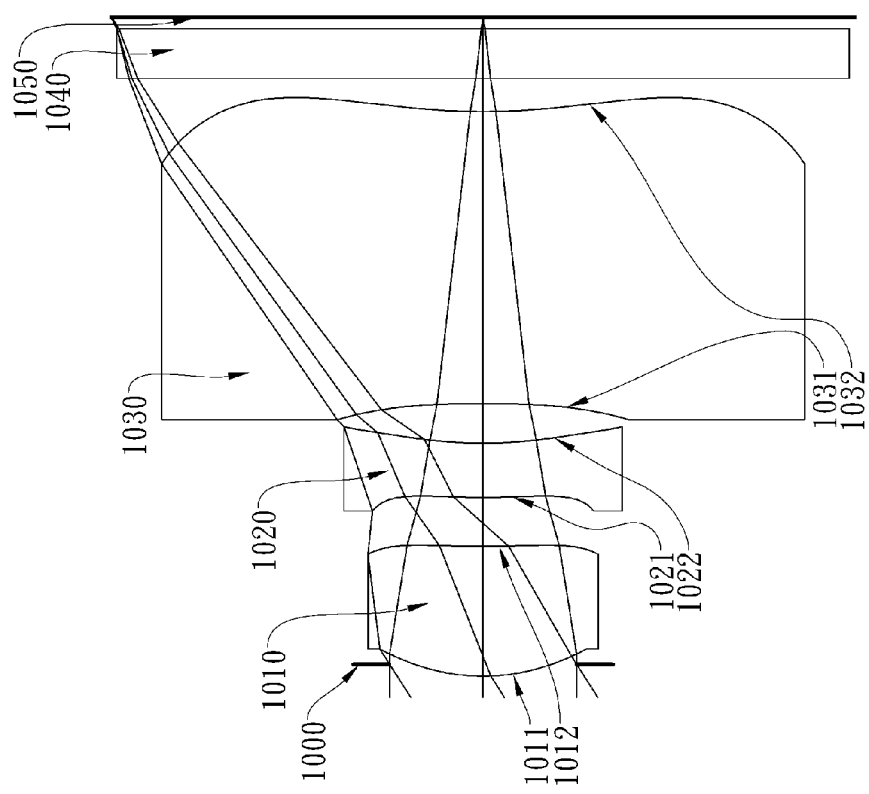
FIG. 10A shows an imaging optical lens system in accordance with a tenth embodiment of the present invention.
Figure 10B:
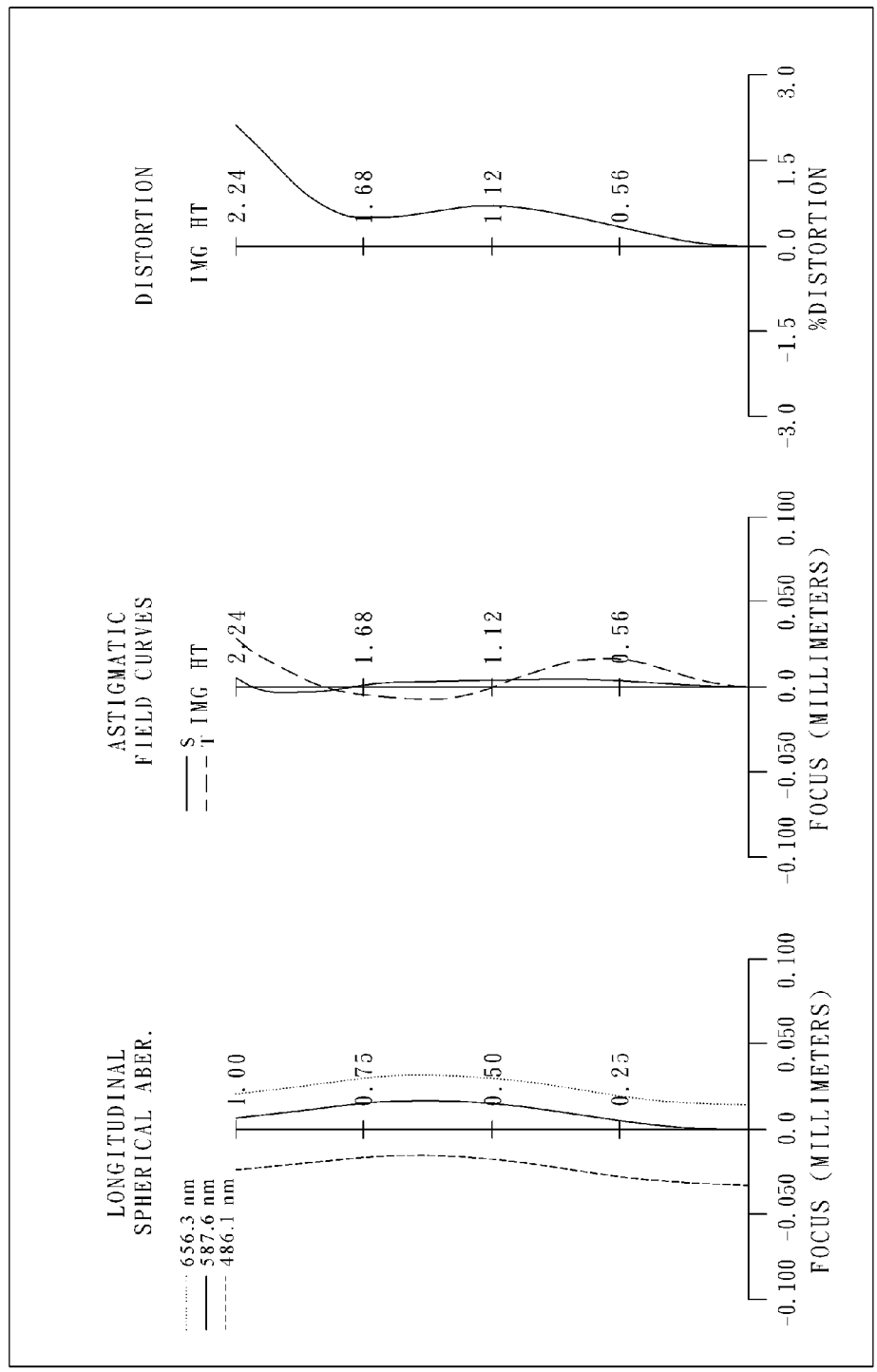
FIG. 10B shows the aberration curves of the tenth embodiment of the present invention.

FIG. 10A shows an imaging optical lens system in accordance with the tenth embodiment of the present invention, and FIG. 10B shows the aberration curves of the tenth embodiment of the present invention. The imaging optical lens system of the tenth embodiment of the present invention mainly comprises three lens elements with refractive power, in order from an object side to an image side:

a plastic first lens element 1010 with positive refractive power having a convex object-side surface 1011 and a concave image-side surface 1012, the object-side and image-side surfaces 1011 and 1012 thereof being aspheric;

a plastic second lens element 1020 with negative refractive power having a convex object-side surface 1021 and a concave image-side surface 1022, the object-side and image-side surfaces 1021 and 1022 thereof being aspheric; and at least one inflection point is positioned on the object-side surface 1021 thereof; and a plastic third lens element 1030 with negative refractive power having concave object-side surface 1031 and a concave image-side surface 1032, the object-side and image-side surfaces 1031 and 1032 thereof being aspheric; wherein the shape of the image-side surface 1032 of the third lens element 1030 changing from concave when near an optical axis to convex when away from the optical axis;

wherein an aperture stop 1000 is disposed between an imaged object and the first lens element 1010; the imaging optical lens system further comprises a IR cut-filter 1040 disposed between the image-side surface 1032 of the third lens element 1030 and an image plane 1050; the filter 1040 is made of glass and has no influence on the focal length of the imaging optical lens system; the imaging optical lens system further comprises an image sensor (figure not shown) provided on the image plane 1050.

The detailed optical data of the tenth embodiment is shown in TABLE 27, and the aspheric surface data is shown in TABLE 28, wherein the units of the radius of curvature, the thickness and the focal length are expressed in mm, and HFOV is half of the maximal field of view.

TABLE 27

(Embodiment 10)
f = 3.43 mm, Fno = 3.05, HFOV = 32.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.072 | | | | |
| 2 | Lens 1 | 1.208 | ASP | 0.782 | Plastic | 1.530 | 55.8 | 2.62 |
| 3 | | 7.305 | ASP | 0.295 | | | | |
| 4 | Lens 2 | 4.468 | ASP | 0.327 | Plastic | 1.607 | 26.6 | −9.51 |
| 5 | | 2.450 | ASP | 0.237 | | | | |
| 6 | Lens 3 | −12.723 | ASP | 1.760 | Plastic | 1.544 | 55.9 | −5.04 |
| 7 | | 3.669 | ASP | 0.200 | | | | |
| 8 | IR-filter | Plano | | 0.300 | Glass | 1.517 | 64.2 | — |
| 9 | | Plano | | 0.071 | | | | |
| 10 | Image | Plano | | — | | | | |

* Reference wavelength for Focal length and Index calculation is 587.6 nm

TABLE 28

Aspheric Coefficients

| | Surface # | | | | | |
|---|---|---|---|---|---|---|
| | 2 | 3 | 4 | 5 | 6 | 7 |
| k = | −4.1220E−01 | −1.0000E+02 | −2.0000E+02 | −2.3060E+01 | −9.4807E+01 | 6.4516E−01 |
| A4 = | 1.4007E−03 | −1.3875E−01 | −1.0669E−01 | −7.1763E−03 | −2.2945E−01 | −6.5458E−02 |
| A6 = | −4.9875E−02 | −1.5520E−01 | −6.4242E−01 | 9.4554E−02 | 1.9346E−01 | 8.3356E−03 |
| A8 = | 1.4438E−01 | −5.4360E−01 | −2.9441E−01 | −3.0849E−01 | −4.6927E−03 | −2.0562E−03 |
| A10 = | −4.6172E−01 | 9.9791E−02 | 9.3862E−01 | 2.6801E−01 | −3.9167E−02 | −6.6046E−04 |
| A12 = | | | −5.0008E+00 | | −3.4976E−02 | 1.4640E−04 |
| A14 = | | | | | −1.6504E−02 | 5.2888E−05 |
| A16 = | | | | | 1.1511E−02 | −1.2421E−05 |

The equation of the aspheric surface profiles of the tenth embodiment has the same form as that of the first embodiment. Moreover, the description of the factors in the relations is as those set forth in the first embodiment, but the values of the relations of the tenth embodiment are listed in the following TABLE 29.

TABLE 29

(Embodiment 10)

| f [mm] | 3.43 | R4/f | 0.71 |
|---|---|---|---|
| Fno | 3.05 | (R3 − R4)/(R3 + R4) | 0.29 |
| HFOV [deg.] | 32.5 | R6/R5 | −0.29 |
| (V1 + V2)/(V1 − V2) | 2.82 | f/f1 | 1.31 |
| V1/V3 | 1.00 | f3/f2 | 0.53 |
| (CT1 + CT2)/CT3 | 0.63 | BL/f | 0.17 |
| |R1/R2| | 0.17 | SAG21/CT2 | −0.25 |

Embodiment 11

Figure 11A:
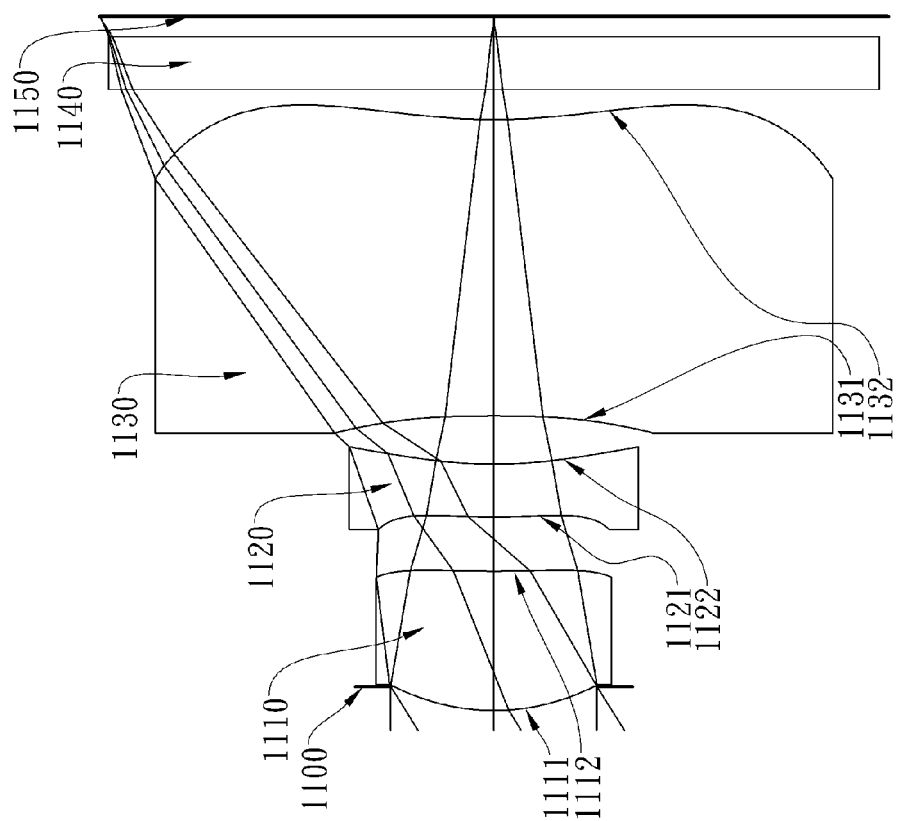
FIG. 11A shows an imaging optical lens system in accordance with an eleventh embodiment of the present invention.
Figure 11B:
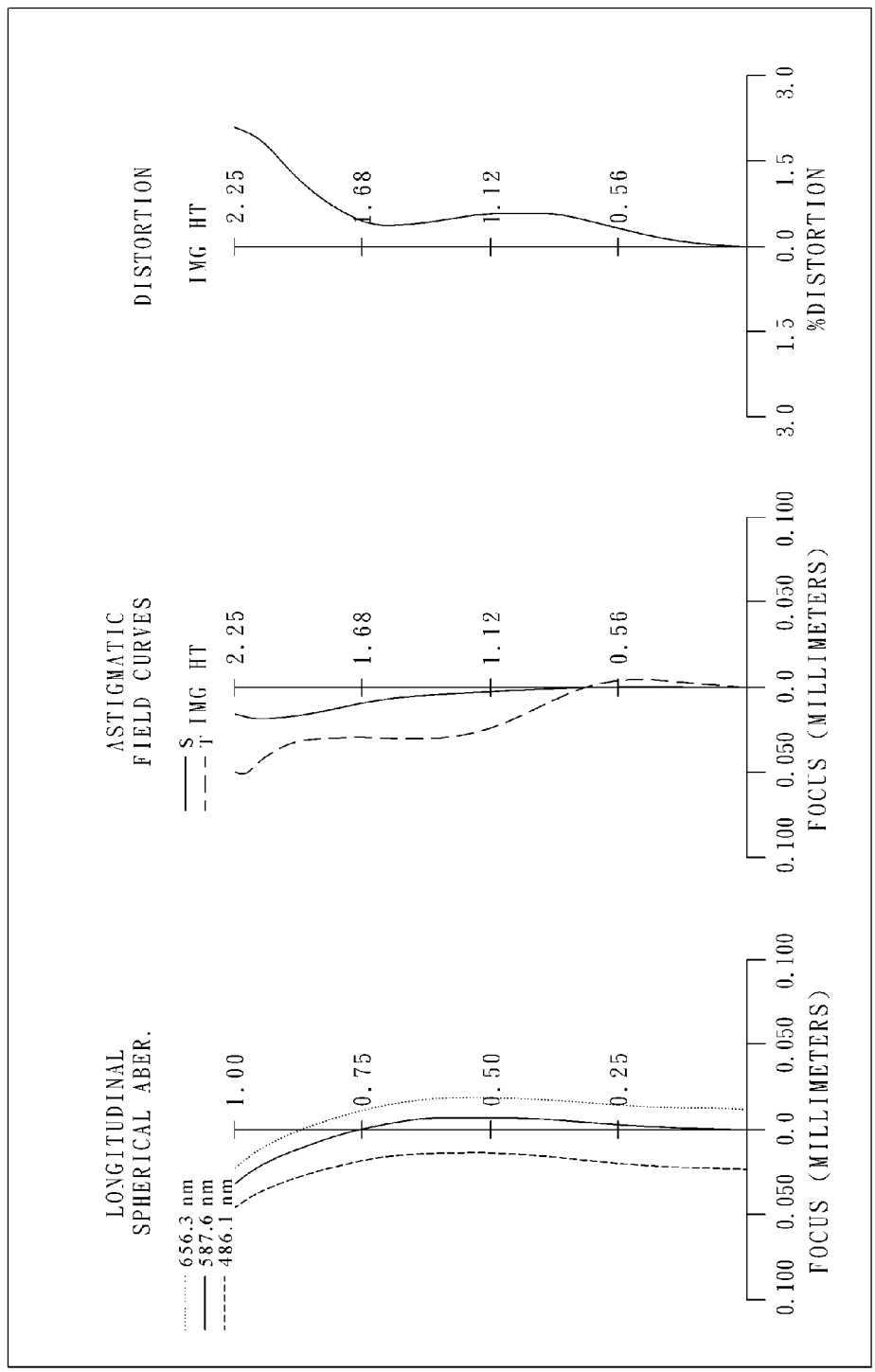
FIG. 11B shows the aberration curves of the eleventh embodiment of the present invention.

FIG. 11A shows an imaging optical lens system in accordance with the eleventh embodiment of the present invention, and FIG. 11B shows the aberration curves of the eleventh embodiment of the present invention. The imaging optical lens system of the eleventh embodiment of the present invention mainly comprises three lens elements with refractive power, in order from an object side to an image side:

a glass first lens element 1110 with positive refractive power having a convex object-side surface 1111 and a concave image-side surface 1112, the object-side and image-side surfaces 1111 and 1112 thereof being aspheric;

a plastic second lens element 1120 with negative refractive power having a convex object-side surface 1121 and a concave image-side surface 1122, the object-side and image-side surfaces 1121 and 1122 thereof being aspheric; and at least one inflection point is positioned on the object-side surface 1121 thereof; and a plastic third lens element 1130 with negative refractive power having concave object-side surface 1131 and a concave image-side surface 1132, the object-side and image-side surfaces 1131 and 1132 thereof being aspheric; wherein the shape of the image-side surface 1132 of the third lens element 1130 changing from concave when near an optical axis to convex when away from the optical axis;

wherein an aperture stop 1100 is disposed between an imaged object and the first lens element 1110; the imaging optical lens system further comprises a IR cut-filter 1140 disposed between the image-side surface 1132 of the third lens element 1130 and an image plane 1150; the filter 1140 is made of glass and has no influence on the focal length of the imaging optical lens system; the imaging optical lens system further comprises an image sensor (figure not shown) provided on the image plane 1150.

The detailed optical data of the eleventh embodiment is shown in TABLE 30, and the aspheric surface data is shown in TABLE 31, wherein the units of the radius of curvature, the thickness and the focal length are expressed in mm, and HFOV is half of the maximal field of view.

TABLE 30

(Embodiment 11)
f = 3.52 mm, Fno = 3.00, HFOV = 32.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.136 | | | | |
| 2 | Lens 1 | 1.214 | ASP | 0.792 | Glass | 1.542 | 62.9 | 2.57 |
| 3 | | 7.285 | ASP | 0.308 | | | | |
| 4 | Lens 2 | 4.549 | ASP | 0.301 | Plastic | 1.650 | 21.4 | −7.96 |
| 5 | | 2.358 | ASP | 0.274 | | | | |
| 6 | Lens 3 | −12.228 | ASP | 1.688 | Plastic | 1.544 | 55.9 | −4.77 |
| 7 | | 3.453 | ASP | 0.170 | | | | |
| 8 | IR-filter | Plano | | 0.300 | Glass | 1.517 | 64.2 | |
| 9 | | Plano | | 0.115 | | | | |
| 10 | Image | Plano | | — | | | | |

* Reference wavelength for Focal length and Index calculation is 587.6 nm

TABLE 31

Aspheric Coefficients

| | Surface # | | | | |
|---|---|---|---|---|---|
| 2 | 3 | 4 | 5 | 6 | 7 |
| k = −4.1018E−01 | −1.0000E+02 | −2.0000E+02 | −2.1930E+01 | −7.1280E+01 | −5.1777E−01 |
| A4 = 1.5665E−03 | −1.3667E−01 | −1.0977E−01 | −5.3376E−03 | −2.2904E−01 | −7.2665E−02 |
| A6 = −5.2841E−02 | −1.4760E−01 | −6.4944E−01 | 9.4895E−02 | 1.9891E−01 | 9.0492E−03 |
| A8 = 1.4405E−01 | −5.3113E−01 | −2.9706E−01 | −3.0888E−01 | 2.8604E−03 | −1.6995E−03 |
| A10 = −4.0573E−01 | 1.1911E−01 | 9.6178E−01 | 2.6804E−01 | −3.1816E−02 | −6.0855E−04 |
| A12 = | | −5.0008E+00 | | −2.9314E−02 | 1.4473E−04 |
| A14 = | | | | −1.4502E−02 | 5.0027E−05 |
| A16 = | | | | 9.1683E−03 | −1.3170E−05 |

The equation of the aspheric surface profiles of the eleventh embodiment has the same form as that of the first embodiment. Moreover, the description of the factors in the relations is as those set forth in the first embodiment, but the values of the relations of the eleventh embodiment are listed in the following TABLE 32.

TABLE 32

(Embodiment 11)

| f [mm] | 3.52 | R4/f | 0.67 |
|---|---|---|---|
| Fno | 3.00 | (R3 − R4)/(R3 + R4) | 0.32 |
| HFOV [deg.] | 32.0 | R6/R5 | −0.28 |
| (V1 + V2)/(V1 − V2) | 2.03 | f/f1 | 1.37 |
| V1/V3 | 1.13 | f3/f2 | 0.60 |
| (CT1 + CT2)/CT3 | 0.65 | BL/f | 0.17 |
| |R1/R2| | 0.17 | SAG21/CT2 | −0.24 |

Embodiment 12

Figure 12A:
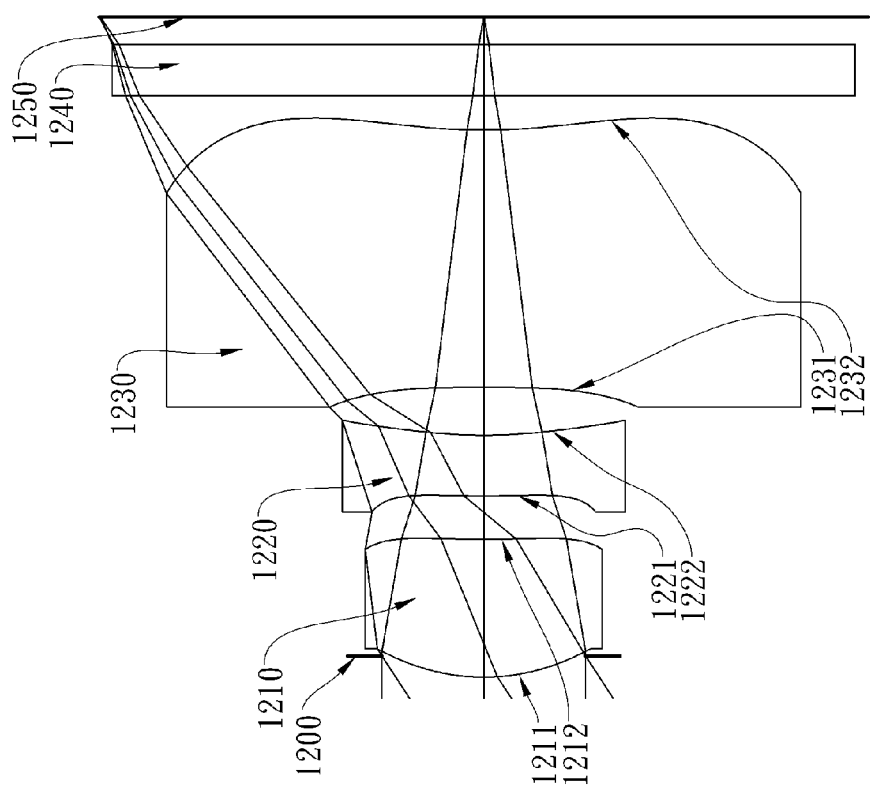
FIG. 12A shows an imaging optical lens system in accordance with a twelfth embodiment of the present invention.
Figure 12B:
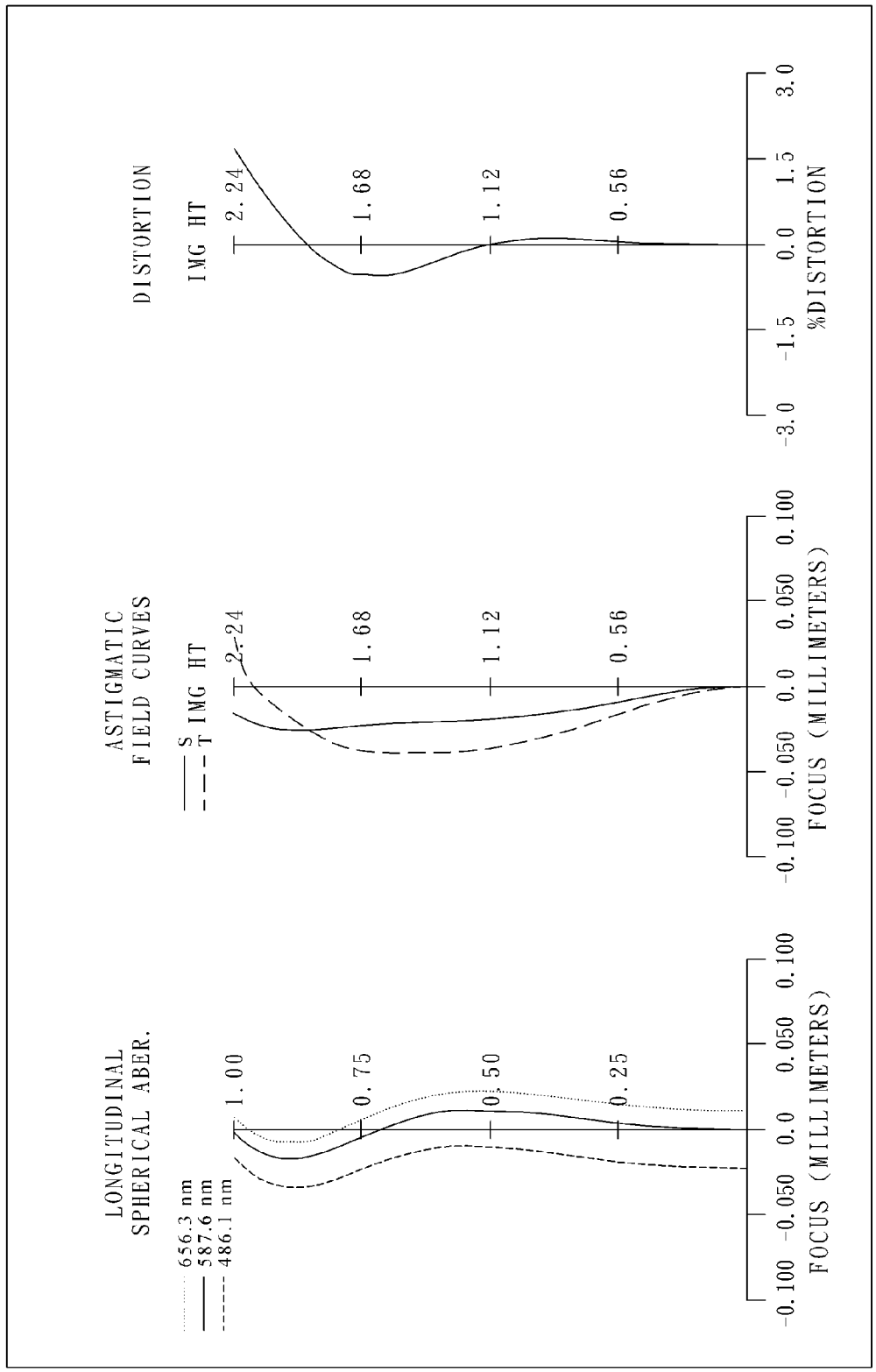
FIG. 12B shows the aberration curves of the twelfth embodiment of the present invention.

FIG. 12A shows an imaging optical lens system in accordance with the twelfth embodiment of the present invention, and FIG. 12B shows the aberration curves of the twelfth embodiment of the present invention. The imaging optical lens system of the twelfth embodiment of the present invention mainly comprises three lens elements with refractive power, in order from an object side to an image side:

a plastic first lens element 1210 with positive refractive power having a convex object-side surface 1211 and a concave image-side surface 1212, the object-side and image-side surfaces 1211 and 1212 thereof being aspheric;

a plastic second lens element 1220 with negative refractive power having a convex object-side surface 1221 and a concave image-side surface 1222, the object-side and image-side surfaces 1221 and 1222 thereof being aspheric; and at least one inflection point is positioned on the object-side surface 1221 thereof; and a plastic third lens element 1230 with negative refractive power having concave object-side surface 1231 and a concave image-side surface 1232, the object-side and image-side surfaces 1231 and 1232 thereof being aspheric; wherein the shape of the image-side surface 1232 of the third lens element 1230 changing from concave when near an optical axis to convex when away from the optical axis;

wherein an aperture stop 1200 is disposed between an imaged object and the first lens element 1210; the imaging optical lens system further comprises a IR cut-filter 1240 disposed between the image-side surface 1232 of the third lens element 1230 and an image plane 1250; the filter 1240 is made of glass and has no influence on the focal length of the imaging optical lens system; the imaging optical lens system further comprises an image sensor (figure not shown) provided on the image plane 1250.

The detailed optical data of the twelfth embodiment is shown in TABLE 33, and the aspheric surface data is shown in TABLE 34, wherein the units of the radius of curvature, the thickness and the focal length are expressed in mm, and HFOV is half of the maximal field of view.

TABLE 33

(Embodiment 12)
f = 3.41 mm, Fno = 2.87, HFOV = 32.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.124 | | | | |
| 2 | Lens 1 | 1.191 | ASP | 0.803 | Plastic | 1.543 | 56.5 | 2.53 |
| 3 | | 6.879 | ASP | 0.253 | | | | |
| 4 | Lens 2 | 6.677 | ASP | 0.354 | Plastic | 1.632 | 23.4 | −7.46 |
| 5 | | 2.707 | ASP | 0.278 | | | | |
| 6 | Lens 3 | −94.572 | ASP | 1.500 | Plastic | 1.583 | 30.2 | −5.20 |
| 7 | | 3.154 | ASP | 0.200 | | | | |
| 8 | IR-filter | Plano | | 0.300 | Glass | 1.517 | 64.2 | — |
| 9 | | Plano | | 0.160 | | | | |
| 10 | Image | Plano | | — | | | | |

* Reference wavelength for Focal length and Index calculation is 587.6 nm

TABLE 34

Aspheric Coefficients

| | Surface # | | | | | |
|---|---|---|---|---|---|---|
| | 2 | 3 | 4 | 5 | 6 | 7 |
| k = | −4.8075E−01 | −4.8694E+01 | −2.0000E+02 | −2.8468E+01 | −9.1826E+01 | −1.7381E+01 |
| A4 = | −2.2480E−03 | −1.6017E−01 | −2.1783E−01 | −2.7601E−02 | −2.7164E−01 | −5.2475E−02 |
| A6 = | −2.8056E−02 | −2.2377E−01 | −5.1232E−01 | 1.0652E−01 | 1.7798E−01 | 4.2802E−03 |
| A8 = | 2.8883E−01 | −6.6799E−01 | −3.0033E−01 | −2.4688E−01 | −1.1785E−02 | −1.8061E−03 |
| A10 = | −8.1427E−01 | 2.2048E−01 | 9.0279E−02 | 2.3104E−01 | −3.1871E−02 | −3.6338E−04 |
| A12 = | | | −5.0008E+00 | | −2.9795E−02 | 1.4904E−04 |
| A14 = | | | | | −1.7655E−02 | 4.6468E−05 |
| A16 = | | | | | 1.2076E−02 | −1.6387E−05 |

The equation of the aspheric surface profiles of the twelfth embodiment has the same form as that of the first embodiment. Moreover, the description of the factors in the relations is as those set forth in the first embodiment, but the values of the relations of the twelfth embodiment are listed in the following TABLE 35.

TABLE 35

(Embodiment 12)

| f [mm] | 3.41 | R4/f | 0.80 |
|---|---|---|---|
| Fno | 2.87 | (R3 − R4)/(R3 + R4) | 0.42 |
| HFOV [deg.] | 32.9 | R6/R5 | −0.03 |
| (V1 + V2)/(V1 − V2) | 2.42 | f/f1 | 1.35 |
| V1/V3 | 1.87 | f3/f2 | 0.70 |
| (CT1 + CT2)/CT3 | 0.77 | BL/f | 0.19 |
| |R1/R2| | 0.17 | SAG21/CT2 | −0.26 |

It is to be noted that TABLES 1-35 show different data of the different embodiments, however, the data of the different embodiments are obtained from experiments. Therefore, any imaging optical lens system of the same structure is considered to be within the scope of the present invention even if it uses different data. The embodiments depicted above and the appended drawings are exemplary and are not intended to limit the scope of the present invention.

What is claimed is:

1. An imaging optical lens system, in order from an object side to an image side comprising three lens elements with refractive power:

a first lens element with positive refractive power having a convex object-side surface at a paraxial region;

a plastic second lens element with negative refractive power having a convex or flat object-side surface at a paraxial region and a concave image-side surface at a paraxial region, and both the object-side surface and the image-side surface being aspheric; and a plastic third lens element with negative refractive power having a concave object-side surface at a paraxial region, the shape of the image-side surface thereof changing from concave when near an optical axis to convex when away from the optical axis, and both the object-side surface and the image-side surface being aspheric;

wherein the lens elements having refractive power in the imaging optical lens system are the first lens element, the second lens element and the third lens element;

wherein a curvature radius of the object-side surface of the second lens element is R3, a curvature radius of the image-side surface of the second lens element is R4, a focal length of the third lens element is f3, a focal length of the second lens element is f2, and they satisfy the following relations:

$0<(R3-R4)/(R3+R4)\leq 1.0$; and $0<f3/f2<3.0$.

2. The imaging optical lens system according to claim 1, wherein the curvature radius of the image-side surface of the second lens element is R4, a focal length of the imaging optical lens system is f, and they satisfy the following relation:

$0.2<R4/f<2.0$.

3. The imaging optical lens system according to claim 1, wherein a curvature radius of the image-side surface of the third lens element is R6, a curvature radius of the object-side surface of the third lens element is R5, and they satisfy the following relation:

$-0.40<R6/R5<0$.

4. The imaging optical lens system according to claim 1, wherein an Abbe number of the first lens element is V1, an Abbe number of the second lens element is V2, and they satisfy the following relation:

$2.0<(V1+V2)/(V1-V2)<3.0$.

5. The imaging optical lens system according to claim 1, wherein a central thickness of the first lens element is CT1, a central thickness of the second lens element is CT2, a central thickness of the third lens element is CT3, and they satisfy the following relation:

$0.5<(CT1+CT2)/CT3<1.0$.

6. The imaging optical lens system according to claim 1, wherein a distance in parallel with an optical axis from an axial vertex on the object-side surface of the second lens element to a maximal effective diameter position on the object-side surface of the second lens element is SAG21, a central thickness of the second lens element is CT2, and they satisfy the following relation:

$-0.5<SAG21/CT2<0.2$.

7. The imaging optical lens system according to claim 1, wherein a curvature radius of the object-side surface of the first lens element is R1, a curvature radius of the image-side surface of the first lens element is R2, and they satisfy the following relation:

$0<|R1/R2|<0.4$.

8. The imaging optical lens system according to claim 1, wherein an axial distance between the image-side surface of the third lens element and an image plane is BL, a focal length of the imaging optical lens system is f, and they satisfy the following relation:

$0.10<BL/f<0.35$.

9. The imaging optical lens system according to claim 1, wherein a focal length of the imaging optical lens system is f, a focal length of the first lens element is f1, and they satisfy the following relation:

$1.0<f/f1<2.0$.

10. The imaging optical lens system according to claim 1, wherein the focal length of the third lens element is f3, the focal length of the second lens element is f2, and they satisfy the following relation:

$0.1<f3/f2<2.0$.

11. The imaging optical lens system according to claim 1, wherein at least one inflection point is positioned on at least one surface of the object-side and image-side surfaces of the second lens element.

12. An imaging optical lens system, in order from an object side to an image side comprising three lens elements with refractive power:

a first lens element with positive refractive power having a convex object-side surface at a paraxial region;

a plastic second lens element with negative refractive power having a convex or flat object-side surface at a paraxial region and a concave image-side surface at a paraxial region, and both the object-side surface and the image-side surface being aspheric; and a plastic third lens element with negative refractive power having a concave object-side surface at a paraxial region, the shape of the image-side surface thereof changing from concave when near an optical axis to convex when away from the optical axis, and both the object-side surface and the image-side surface being aspheric;

wherein the lens elements having refractive power in the imaging optical lens system are the first lens element, the second lens element and the third lens element;

wherein a curvature radius of the object-side surface of the second lens element is R3, a curvature radius of the image-side surface of the second lens element is R4, an Abbe number of the first lens element is V1, an Abbe number of the second lens element is V2, and they satisfy the following relations:

$0<(R3-R4)/(R3+R4)\leq 1.0$; and $1.8<(V1+V2)/(V1-V2)<5.0$.

13. The imaging optical lens system according to claim 12, wherein the Abbe number of the first lens element is V1, the Abbe number of the second lens element is V2, and they satisfy the following relation:

$2.0<(V1+V2)/(V1-V2)<3.0$.

14. The imaging optical lens system according to claim 12, wherein an axial distance between the image-side surface of the third lens element and an image plane is BL, a focal length of the imaging optical lens system is f, and they satisfy the following relation:

$0.10<BL/f<0.35$.

15. The imaging optical lens system according to claim 12, wherein the Abbe number of the first lens element is V1, an Abbe number of the third lens element is V3, and they satisfy the following relation:

$1.5 < V1/V3 < 3.5.$

16. The imaging optical lens system according to claim 12, wherein half of the maximal field of view of the imaging optical lens system is HFOV, and it satisfies the following relation:

$25\text{ degree} < HFOV < 40\text{ degree}.$

17. The imaging optical lens system according to claim 12, wherein a distance in parallel with an optical axis from an axial vertex on the object-side surface of the second lens element to a maximal effective diameter position on the object-side surface of the second lens element is SAG21, a central thickness of the second lens element is CT2, and they satisfy the following relation:

$-0.5 < SAG21/CT2 < 0.2.$

18. The imaging optical lens system according to claim 12, wherein a curvature radius of the object-side surface of the first lens element is R1, a curvature radius of the image-side surface of the first lens element is R2, and they satisfy the following relation:

$0 < |R1/R2| < 0.4.$

19. The imaging optical lens system according to claim 12, wherein a central thickness of the first lens element is CT1, a central thickness of the second lens element is CT2, a central thickness of the third lens element is CT3, and they satisfy the following relation:

$0.5 < (CT1+CT2)/CT3 < 1.0.$

20. The imaging optical lens system according to claim 12, wherein at least one inflection point is positioned on at least one surface of the object-side and image-side surfaces of the second lens element.

21. The imaging optical lens system according to claim 12, wherein a curvature radius of the image-side surface of the third lens element is R6, a curvature radius of the object-side surface of the third lens element is R5, and they satisfy the following relation:

$-0.40 < R6/R5 < 0.$

* * * * *